US011030062B2

(12) United States Patent
Juniwal et al.

(10) Patent No.: US 11,030,062 B2
(45) Date of Patent: *Jun. 8, 2021

(54) CHUNK ALLOCATION

(71) Applicant: Rubrik, Inc., Palo Alto, CA (US)

(72) Inventors: Garvit Juniwal, Mountain View, CA (US); Gaurav Jain, Mountain View, CA (US); Adam Gee, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,008

(22) Filed: Sep. 12, 2019

(65) Prior Publication Data

US 2020/0057699 A1 Feb. 20, 2020

Related U.S. Application Data

(63) Continuation of application No. 15/802,792, filed on Nov. 3, 2017, now Pat. No. 10,423,503, which is a (Continued)

(51) Int. Cl.
*G06F 11/00* (2006.01)
*G06F 11/16* (2006.01)
(Continued)

(52) U.S. Cl.
CPC ........ *G06F 11/1666* (2013.01); *G06F 3/0604* (2013.01); *G06F 3/0631* (2013.01);
(Continued)

(58) Field of Classification Search
CPC ............. G06F 11/2017; G06F 11/2056; G06F 11/2071; G06F 11/2076; G06F 11/2079;
(Continued)

(56) References Cited

U.S. PATENT DOCUMENTS 6,317,808 B1   11/2001   Berenshteyn
7,590,775 B2   9/2009    Gildfind et al.
(Continued)

FOREIGN PATENT DOCUMENTS

WO   2015179533   11/2015
WO   2016010912   1/2016
(Continued)

OTHER PUBLICATIONS

"U.S. Appl. No. 15/658,348, Final Office Action dated Dec. 12, 2019", 32 pages.
(Continued)

*Primary Examiner* — Sarai E Butler
(74) *Attorney, Agent, or Firm* — Schwegman Lundberg & Woessner, P.A.

(57) ABSTRACT

Methods and systems for identifying a set of disks within a cluster and then storing a plurality of data chunks into the set of disks such that the placement of the plurality of data chunks within the cluster optimizes failure tolerance and storage system performance for the cluster are described. The plurality of data chunks may be generated using replication of data (e.g., n-way mirroring) or application of erasure coding to the data (e.g., using a Reed-Solomon code or a Low-Density Parity-Check code). The topology of the cluster including the physical arrangement of the nodes and disks within the cluster and status information for the nodes and disks within the cluster (e.g., information regarding disk fullness, disk performance, and disk age) may be used to identify the set of disks in which to store the plurality of data chunks.

21 Claims, 20 Drawing Sheets

Related U.S. Application Data continuation of application No. 15/674,362, filed on Aug. 10, 2017, now Pat. No. 10,339,016.

(51) Int. Cl.
*G06F 9/455* (2018.01)
*G06F 3/06* (2006.01)

(52) U.S. Cl.
CPC ........ *G06F 3/0689* (2013.01); *G06F 9/45558* (2013.01); *G06F 11/1662* (2013.01); *G06F 2009/45583* (2013.01); *G06F 2201/84* (2013.01)

(58) Field of Classification Search
CPC ............. G06F 11/2087; G06F 11/2089; G06F 11/2092; G06F 11/2074; G06F 11/1084; G06F 11/1092; G06F 11/16; G06F 11/1612; G06F 11/1666; G06F 11/2053; G06F 11/2094
USPC .............................................. 714/6.21, 1–57
See application file for complete search history.

(56) References Cited

U.S. PATENT DOCUMENTS

| | | | |
|---|---|---|---|
| 7,908,410 | B2 | 3/2011 | Gildfind et al. |
| 9,442,760 | B2 | 9/2016 | Boutin et al. |
| 9,596,143 | B2 | 3/2017 | Garg et al. |
| 9,626,177 | B1 | 4/2017 | Madduri et al. |
| 9,986,563 | B2 | 5/2018 | Owen et al. |
| 10,033,620 | B1 | 7/2018 | Sledz et al. |
| 10,097,478 | B2 | 10/2018 | To et al. |
| 10,187,318 | B2 | 1/2019 | Cote et al. |
| 10,339,016 | B2 | 7/2019 | Juniwal et al. |
| 10,423,503 | B2 | 9/2019 | Juniwal et al. |
| 10,819,656 | B2 | 10/2020 | Moldvai et al. |
| 2005/0267920 | A1 | 12/2005 | Helliker et al. |
| 2006/0028987 | A1 | 2/2006 | Gildfind et al. |
| 2007/0043968 | A1* | 2/2007 | Chen .................. G06F 11/1092 714/6.12 |
| 2007/0189153 | A1* | 8/2007 | Mason ................ G06F 21/6209 370/216 |
| 2008/0104150 | A1 | 5/2008 | Moore et al. |
| 2010/0017545 | A1 | 1/2010 | Gildfind et al. |
| 2010/0049929 | A1 | 2/2010 | Nagarkar et al. |
| 2010/0192213 | A1 | 7/2010 | Ta et al. |
| 2012/0195324 | A1 | 8/2012 | Raghuraman et al. |
| 2013/0173553 | A1 | 7/2013 | Apte et al. |
| 2013/0173627 | A1 | 7/2013 | Apte et al. |
| 2014/0211811 | A1 | 7/2014 | Ludwig et al. |
| 2014/0244927 | A1* | 8/2014 | Goldberg ............. G06F 3/0646 711/114 |
| 2015/0160872 | A1* | 6/2015 | Chen .................... G06F 3/0607 711/114 |
| 2015/0281357 | A1 | 10/2015 | Makida et al. |
| 2015/0282180 | A1 | 10/2015 | Owen et al. |
| 2015/0370502 | A1 | 12/2015 | Aron et al. |
| 2016/0098292 | A1 | 4/2016 | Boutin et al. |
| 2016/0124665 | A1 | 5/2016 | Jain et al. |
| 2016/0142335 | A1 | 5/2016 | Makida et al. |
| 2016/0212065 | A1 | 7/2016 | To et al. |
| 2016/0315830 | A1 | 10/2016 | Cote et al. |
| 2017/0134289 | A1 | 5/2017 | Xiao et al. |
| 2018/0091436 | A1 | 3/2018 | Dukkipati et al. |
| 2018/0131605 | A1 | 5/2018 | Jain |
| 2019/0028403 | A1 | 1/2019 | Moldvai et al. |
| 2019/0050301 | A1 | 2/2019 | Juniwal et al. |
| 2019/0050302 | A1 | 2/2019 | Juniwal et al. |

FOREIGN PATENT DOCUMENTS

| | | |
|---|---|---|
| WO | 2016022568 | 2/2016 |
| WO | 2016022583 | 2/2016 |
| WO | 2016054162 | 4/2016 |
| WO | 2016180049 | 11/2016 |
| WO | 2019023260 | 1/2019 |

OTHER PUBLICATIONS

"U.S. Appl. No. 15/658,348, Response filed Feb. 11, 2020 to Final Office Action dated Dec. 12, 2019", 15 pages.
"U.S. Appl. No. 15/658,348, Examiner Interview Summary dated Feb. 12, 2020", 3 pages.
"U.S. Appl. No. 15/658,348, Advisory Action dated Mar. 18, 2020", 7 pages.
"U.S. Appl. No. 15/658,348, Examiner Interview Summary dated Aug. 23, 2019", 3 pages.
"U.S. Appl. No. 15/658,348, Non Final Office Action dated Mar. 20, 2019", 25 pages.
"International Application Serial No. PCT US2018 043530, Invitation to Pay Additional Fees dated Oct. 10, 2018", 11 pages.
"International Application Serial No. PCT US2018 043530, International Search Report dated Jan. 14, 2019", 6 pages.
"International Application Serial No. PCT US2018 043530, Written Opinion dated Jan. 14, 2019", 14 pages.
"U.S. Appl. No. 15/658,348, Response filed Aug. 20, 2019 to Non Final Office Action dated Mar. 20, 2019", 10 pages.
"U.S. Appl. No. 15/674,362, Non Final Office Action dated Feb. 7, 2019", 8 pages.
"U.S. Appl. No. 15/674,362, Response filed Mar. 29, 2019 to Non Final Office Action dated Feb. 7, 2019", 8 pages.
"U.S. Appl. No. 15/674,362, Notice of Allowance dated Apr. 17, 2019", 8 pages.
"U.S. Appl. No. 15/802,792, Response filed Mar. 29, 2019 to Non Final Office Action dated Feb. 7, 2019", 10 pages.
"U.S. Appl. No. 15/802,792, Non Final Office Action dated Feb. 7, 2019", 8 pages.
"U.S. Appl. No. 15/802,792, Notice of Allowance dated Jun. 5, 2019", 8 pages.
"U.S. Appl. No. 15/658,348, Notice of Allowance dated Jun. 23, 2020", 10 pgs.
Jain, N, "Partitioning Low-Diameter Networks to Eliminate Inter-Job Interference", 2017 IEEE International Parallel and Distributed Processing Symposium (IPDPS), Orlando, FL, (2017), 439-448.

\* cited by examiner

```
Virtual Machine A, Version V7 {
    pBase,        ———▶  /snapshots/VM_A/s5/s5.full
    pF1,          ———▶  /snapshots/VM_A/s6/s6.delta
    pF2           ———▶  /snapshots/VM_A/s7/s7.delta
}
```

```
Virtual Machine A, Version V2 {
    pBase,        ———▶  /snapshots/VM_A/s5/s5.full
    pR1,          ———▶  /snapshots/VM_A/s4/s4.delta
    pR2,          ———▶  /snapshots/VM_A/s3/s3.delta
    pR3           ———▶  /snapshots/VM_A/s2/s2.delta
}
```

```
Virtual Machine A, Version V7 {
    pBase2,                    ——▶  /snapshots/VM_A/s7/s7.full
}
```

```
Virtual Machine A, Version V2 {
    pBase2,                    ——▶  /snapshots/VM_A/s7/s7.full
    pR11,                      ——▶  /snapshots/VM_A/s6/s6.delta
    pR12,                      ——▶  /snapshots/VM_A/s5/s5.delta
    pR1,                       ——▶  /snapshots/VM_A/s4/s4.delta
    pR2,                       ——▶  /snapshots/VM_A/s3/s3.delta
    pR3                        ——▶  /snapshots/VM_A/s2/s2.delta
}
```

```
Virtual Machine B, Version V1 {
    pBase,
    pR1,
    pR2,
    pF3
}
```

```
Virtual Machine C, Version V2 {
    pBase,
    pF1,
    pF5,
    pF6
}
```

```
Virtual Machine B, Version V1 {
    pBase2,
    pR11,
    pR12,
    pR1,
    pR2,
    pF3
}
```

```
Virtual Machine C, Version V2 {
    pBase2,
    pR11,
    pF5,
    pF6
}
```

```
Virtual Machine A, Version VS {
    pBaseA,
    pR4,
}
```

```
Virtual Machine A, Version VU {
    pBaseB,
    pR1,
    pR2,
    pR3
}
```

```
Virtual Machine A, Version VU {
    pBaseA,
    pF9
}
```

Versions of File X on Virtual Machine A

Version X1 of File X saved at Time T1 ⟶ Version A23 of Virtual Machine A
Version X2 of File X saved at Time T2 ⟶ Version A45 of Virtual Machine A
Version X3 of File X saved at Time T3 ⟶ Version A58 of Virtual Machine A
Version X4 of File X saved at Time T4 ⟶ Version A72 of Virtual Machine A Versions of File Y on Virtual Machine A Version Y1 of File Y saved at Time T2 ⟶ Version A45 of Virtual Machine A
Version Y2 of File Y saved at Time T8 ⟶ Version A95 of Virtual Machine A

FIG. 3E

```
Virtual Machine A, Version A45 {
    pBase,           ⟶  /snapshots/VM_A/s100/s100.full
    pR1,             ⟶  /snapshots/VM_A/s99/s99.delta
    pR2,             ⟶  /snapshots/VM_A/s98/s98.delta
      .
      .
      .
    pR54,            ⟶  /snapshots/VM_A/s46/s46.delta
    pR55             ⟶  /snapshots/VM_A/s45/s45.delta
}
```

FIG. 3F

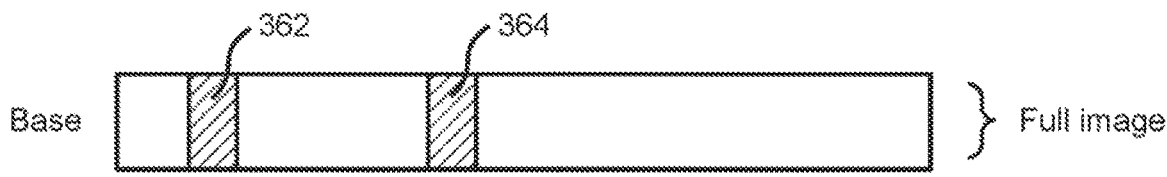

FIG. 3G

Appliance A1
> Appliance Fullness = 50%
> Nodes = N1, N2

Node N1 — 422
   > Node Fullness = 75%
   > Node SSD Available = 0.2TB
   > Node HDD Available = 3TB
   > Disks = X1, X2, X3

Node N2 — 423
   > Node Fullness = 25%
   > Node SSD Available = 0.3TB
   > Node HDD Available = 9TB
   > Disks = Y1, Y2, Y3

Appliance A2
> Appliance Fullness = 25%
> Nodes = N3

Node N3 — 424
   > Node Fullness = 25%
   > Node SSD Available = 0.3TB
   > Node HDD Available = 9TB
   > Disks = Z1, Z2, Z3

Score(DiskA) = PreferredDisk(DiskA) ~480
 + FD_Dist(DiskA,DiskB) ~481
 + FD_Dist(DiskA,DiskC) ~482
 - FailureRisk(DiskA) ~483
 - Fullness(DiskA) ~484
 - PerformancePenalty(DiskA) ~485

FIG. 4H

ChunkAllocationScore = Score(DiskA) + Score(DiskB) + Score(DiskC)

FIG. 4I

Generate a plurality of data chunks associated with a snapshot ~442

Identify a set of preferred disks out of a plurality of disks within a cluster based on the snapshot ~444

Acquire disk status information for the plurality of disks ~446

Determine a plurality of failure domains for the plurality of disks using the disk status information ~448

Identify a set of disks out of the plurality of disks within the cluster in which to store the plurality of data chunks based on the set of preferred disks and the plurality of failure domains ~450

Write the plurality of data chunks to the set of disks ~452

FIG. 4J

CHUNK ALLOCATION

CLAIM OF PRIORITY

The present application is a continuation of and claims priority to U.S. patent application Ser. No. 15/802,792, entitled "Chunk Allocation," filed Nov. 3, 2017, which application claims priority to U.S. patent application Ser. No. 15/674,362, entitled "Chunk Allocation," filed Aug. 10, 2017, issued as U.S. Pat. No. 10,339,016, on Jul. 2, 2019, which applications are herein incorporated by reference in their entirety.

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

BRIEF DESCRIPTION OF THE DRAWINGS

FIG. 3E depicts one embodiment of a virtual machine search index.

FIG. 3F depicts one embodiment of a merged file for the version A45 of Virtual Machine A referred to in FIG. 3E.

FIG. 3G depicts one embodiment of a first portion of a base image and a second portion of the base image.

FIG. 4H depicts one embodiment of a storage utility function for scoring a particular disk for allocation.

FIG. 4I depicts one embodiment of a storage utility function for scoring a total disk allocation.

FIG. 4J is a flowchart describing one embodiment of a process for identifying a set of disks within a duster and then storing a plurality of data chunks into the set of disks such that the placement of the plurality of data chunks within the duster optimizes failure tolerance and storage system performance for the cluster.

DETAILED DESCRIPTION

Figure 1A:
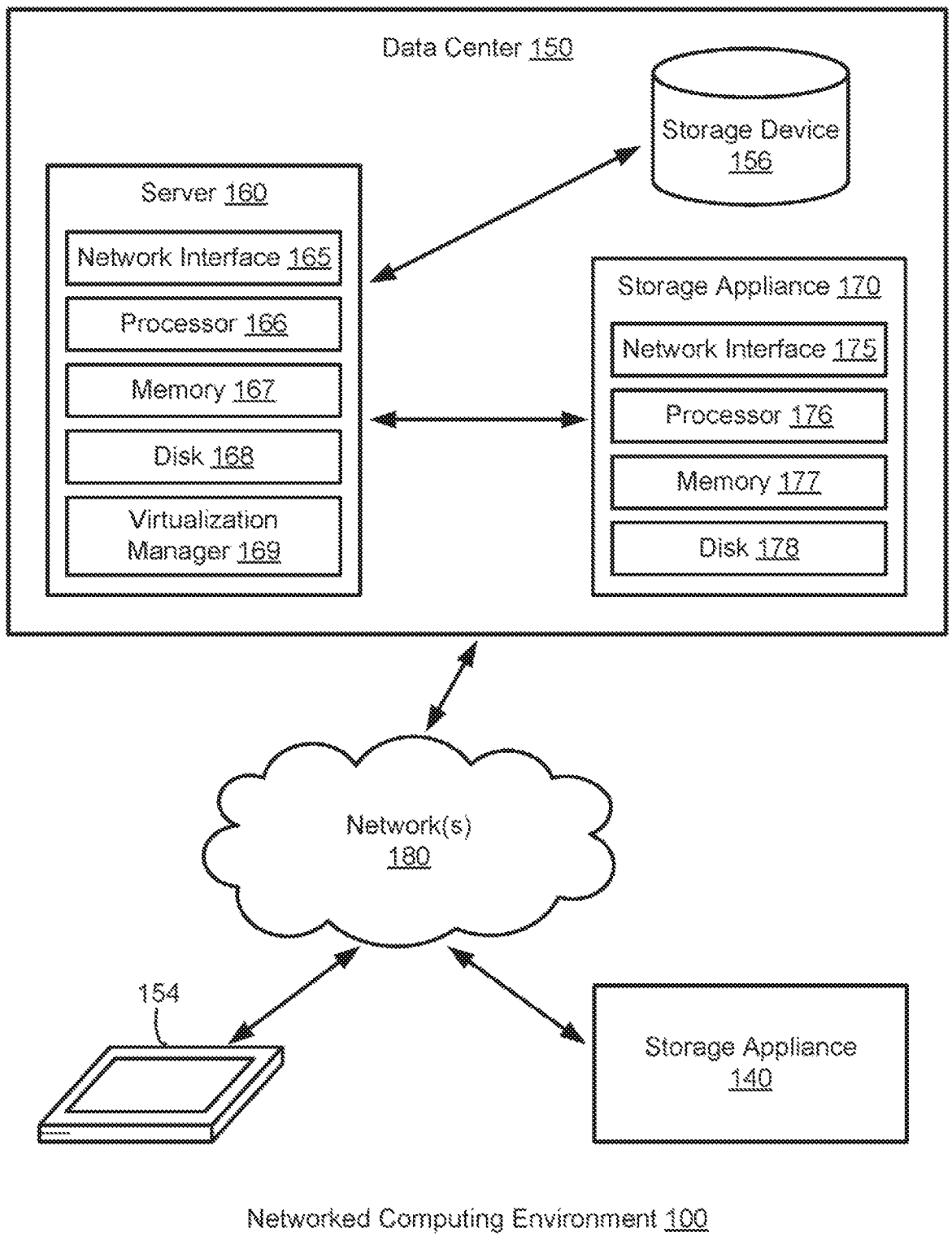
FIG. 1A depicts one embodiment of a networked computing environment.

Technology is described for identifying a set of disks within a cluster and then storing a plurality of data chunks into the set of disks such that the placement of the plurality of data chunks within the cluster optimizes failure tolerance and storage system performance for the cluster. In some cases, rather than determining a set of disks in which to store the plurality of data chunks, a set of nodes may be identified for the allocation or storage of the plurality of data chunks. Each node in the set of nodes may include one or more disks for storing one or more chunks of the plurality of data chunks. In one example, a first data chunk may be stored in a first disk of a first node and a second data chunk may be stored in a second disk of a second node. The plurality of data chunks may be generated or determined using replication of data (e.g., a file may be divided into segments and each segment may be replicated such that a number of identical copies of each segment are generated) or by applying erasure coding or parity based data protection techniques to the data (e.g., using a Reed-Solomon code or a Low-Density Parity-Check code). The topology of the cluster (e.g., the arrangement of the nodes and disks within the cluster) and status information for nodes and disks within the cluster (e.g., information regarding disk fullness, disk performance, and disk age) may be used to identify the optimum or best set of disks in which to store the plurality of data chunks for a given storage utility function. The storage utility function may weigh or take into consideration the failure domain distance between the disks of the set of disk, the disk fullness of each disk in the set of disks, the age of each disk of the set of disks, and the relationship or the degree of similarity between the data chunks to be stored and other data chunks residing on the set of disks (e.g., whether other data chunks corresponding with a particular snapshot or a snapshot chain reside on the set of disks). In some cases, the plurality of chunks may correspond with a snapshot of a virtual machine and the plurality of chunks may be stored using disks that also store other chunks corresponding with other snapshots of the virtual machine. Co-locating data chunks that derive from snapshots of the same virtual machine on multiple disks across multiple nodes within the cluster may increase failure tolerance against hardware failures (e.g., disk failures) while maintaining read and write performance.

In some embodiments, the topology of the cluster may be organized into a hierarchical disk resource pool that serves allocation requests for a specified number of replicas or a specified number of data chunks to be stored. The disks in the allocation may be determined based on various factors, such as failure tolerance (e.g., redundant replicas should be spread into different failure domains), fullness (e.g., disks should be balanced in terms of used space so that there are no hotspots), and performance (e.g., replicas of related data should be placed together so that all related data can be accessed locally). Various components (e.g., disks, nodes, appliances, and racks) within the hierarchical disk resource pool may be grouped into failure domains. A failure domain may comprise a grouping of devices or components (e.g., disks) that have correlated failures or that are likely to fail together due to a failure event (e.g., due to a power failure or a network connectivity failure). Each grouping may include a number of lower-level sub-groups. In one example, a hierarchical disk resource pool may include a root grouping corresponding with all of the components within a cluster, a second sub-grouping corresponding with components sharing a datacenter rack, a third sub-grouping corresponding with the components within a storage appliance supported by the datacenter rack, and a fourth sub-grouping corresponding with the components within a node of the storage appliance (e.g., a grouping of disks within the node). The disk allocation method may take into account the distance between failure domains or the sub-groupings when determining which disks to identify for a given allocation request. Each disk in the hierarchical disk resource pool may be ranked and a flat sequence may be created providing an order in which the disks will be tried for allocation. In one example, the flat sequence may be created recursively by interleaving sub-sequences from the sub-groupings. The sub-groupings may be ordered based on a weighted shuffle with weights assigned to each sub-group according to its overall fullness and any preference given in the allocation request (e.g., to target a set of preferred nodes or preferred disks that store related data).

The failure domain groupings within the hierarchical disk resource pool may be static or dynamically adjusted over time. The dynamic configuration of failure domains is particular advantageous for large clusters with numerous nodes because the probability of multiple failures rises with cluster size. Initially, the failure domains may be determined based on the topology of the cluster and the physical locations of the components within the cluster. For example, each rack may comprise a failure domain at the rack level as a rack may support many storage appliances with correlated failures and each appliance may comprise a failure domain at the appliance level as the nodes within an appliance will have correlated failures. The failure domain groupings at each level within the hierarchical disk resource pool may be determined based on disk and node status information, such as component age (e.g., disk age or node age), historical failure rate for components, networking conditions, power outage patterns, and the mean-time-to-failure (MTTF) values for the components (e.g., the MTTF for each disk). In one embodiment, the failure domain groupings at the disk level may be determined based on disk age (e.g., all disks between 1-2 years assigned to a first grouping and all disks between 2-3 years assigned to a second grouping). In another embodiment, the failure domain groupings at the disk level may be determined based on disk age and disk MTTF values such that all disks expected to fail within one year are assigned to a first grouping and all disks expected to fail within 1-3 years assigned to a second grouping. In another embodiment, the failure domain groupings at the disk level may be determined based on historical failure rates such that all disks with a historical failure rate above a threshold or within a first range are assigned to a first grouping and all disks with a historical failure rate less than the threshold or within a second range different from the first range are assigned to a second grouping. In another embodiment, the failure domain groupings at the disk level may be determined independent of the physical location of the disks. The cluster may acquire or update the disk and node status information periodically and adjust the failure domain groupings over time such that components within each failure domain have a high probability of correlated failures.

In some embodiments, each node in a cluster may generate a local hierarchical resource pool or maintain a table of node and disk status information for each node in the cluster. The hierarchical resource pool may correspond with a graph data structure in which each disk in the cluster is mapped to a node, each node is mapped to a storage appliance, and each storage appliance is mapped to a rack or other physical grouping of storage appliances. The hierarchical resource pool or table of node and disk status information may be updated at a particular update frequency (e.g., periodically refreshed every ten seconds), updated in response to detection of a particular event (e.g., a disk failure or the addition or deletion of a disk or node to the cluster), or updated every time a snapshot is to be stored within the cluster. A cluster-level table of node and disk status information that includes disk specific and node specific information may be stored in a distributed metadata store, such as distributed metadata store 110 in FIG. 1C. The node information may comprise information regarding node fullness, node historical performance, node age, and node history of failures. The disk information may include information regarding disk fullness, disk performance (e.g., a historical rate of operations), disk age, and disk history or frequency of failures. The node and/or disk information may be used to identify the optimum or best set of nodes and/or disks in which to write replicated chunks of data. The optimum set of nodes and/or disks may be determined by determining a cost or score for each node and/or disk and then ranking the nodes and/or disks based on the costs or scores of the nodes and/or disks. The score given to a particular disk may depend on the fullness of the disk, a prior history of failures for the disk, and the proposed selection of other disks in the allocation. For example, in order to maximize failure tolerance, the failure domain distance between the disk and the other disks in an allocation should be maximized.

In one embodiment, the failure domain distance between a first disk and a second disk may correspond with the number of edges within a hierarchical resource pool separating a first disk-level failure domain that includes the first disk and a second disk-level failure domain that includes the second disk. The failure domain distance between a first disk and a second disk may correspond with the number of edge traversals between the disk-level failure domain corresponding with the first disk and the disk-level failure domain corresponding with the second disk. In one example, the failure domain distance between a first disk and a second disk that are within the same node may be 2, the failure domain distance between a first disk and a second disk that are in different nodes within the same storage appliance may be 4, the failure domain distance between a first disk and a second disk that are in different nodes that are in different storage appliances that are supported by a common rack may be 6, and the failure domain distance between a first disk and a second disk that are in different nodes that are in different storage appliances that are supported by different racks within a data center may be 8. In another embodiment, the failure domain distance between a first disk and a second disk may correspond with the height of the highest-level failure domain that is shared by the first disk and the second disk. In one example, the failure domain distance between a first disk and a second disk that are within the same node may be 1, the failure domain distance between a first disk and a second disk that are in different nodes within the same storage appliance may be 2, the failure domain distance between a first disk and a second disk that are in different nodes that are in different storage appliances that are supported by a common rack may be 3, and the failure domain distance between a first disk and a second disk that are in different nodes that are in different storage appliances that are supported by different racks within a data center may be 4. A greater failure domain distance between the first disk and the second disk may correspond with a lower probability of correlated failures.

In some embodiments, an integrated data management and storage system may acquire a file associated with snapshot of a virtual machine, partition the file into a plurality of segments, generate a plurality of data chunks corresponding with the plurality of segments (e.g., via replication or application of erasure coding), identify a set of disks within a cluster, and write the plurality of data chunks to the set of disks. The integrated data management and storage system may identify the set of disks by acquiring node and/or disk status information (e.g., disk fullness, disk performance, and disk age), determining a set of preferred disks based on the disk locations of other data chunks corresponding with the snapshot or the snapshot chain that includes the snapshot, update failure domains for the cluster, and determine the set of disks using the node and/or disk status information, the set of preferred disks, and failure domain distances for the set of disks. The integrated data management and storage system may identify the set of preferred disks based on chunk storage locations associated with other chunks within the same snapshot of the virtual machine or within the same snapshot chain as the snapshot (e.g., data chunks corresponding with related incremental files for the virtual machine). The failure domains for the cluster may be dynamically adjusted over time (e.g., on a periodic basis, such as every 2 minutes, or on an event driven basis, such as upon a request for a new allocation) causing the failure domain distance between two different disks to change as the disks age and as disks are added to or removed from the cluster.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes each are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years. In one embodiment, the integrated data management and storage system may assign a virtual machine to a backup class (e.g., an SLA class) associated with a backup schedule (e.g., specifying backup frequency and retention), acquire snapshots of the virtual machine over time based on the backup schedule, determine how to store the snapshots over time (e.g., as full image snapshots or as incremental snapshots) and store the snapshots (e.g., using a SSD or HDD), determine when to archive the snapshots (e.g., moving a snapshot from a focal cluster to a private or public cloud service), and subsequently consolidate or delete the snapshots. Selectively transferring snapshots as they age from a local cluster to archived storage in the cloud may increase the cluster's effective capacity for storing additional snapshots and improve the overall performance of the cluster.

The integrated data management and storage system may generate and maintain a global index of backed-up files and machines (real and virtual) across local data storage and cloud storage. The global index may be used to provide granular file search and recovery of one or more individual files stored on a particular point in time version of a backed-up machine that has been stored in a distributed cluster and/or in the cloud. The integrated data management and storage system may access the global index to quickly locate requested versions of the individual files regardless of whether the files are located on a local cluster and/or in the cloud. In some cases, to restore the individual files from a particular snapshot of a backed-up machine, the integrated data management and storage system may only need to download a small portion of the backed-up machine from the cloud, thereby significantly reducing network congestion and the associated download costs for transferring the backed-up machine from the cloud to the local cluster. In one example, the integrated data management and storage system may download 50 KB of a 10 TB virtual machine from the cloud in order to restore three individual files (e.g., a word processing file, a spreadsheet, and a database).

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. An integrated data management and storage system may enable substantially instantaneous recovery of applications running on the virtual infrastructure without requiring the applications to be restored first to a primary storage platform. The integrated data management and storage system may provide a unified primary and secondary storage system that allows virtual machine snapshots to be directly mounted and used by secondary workloads, thereby providing a non-passive data storage for backups and supporting secondary workloads that require access to production data stored on a primary storage platform used within a production environment. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 1B:
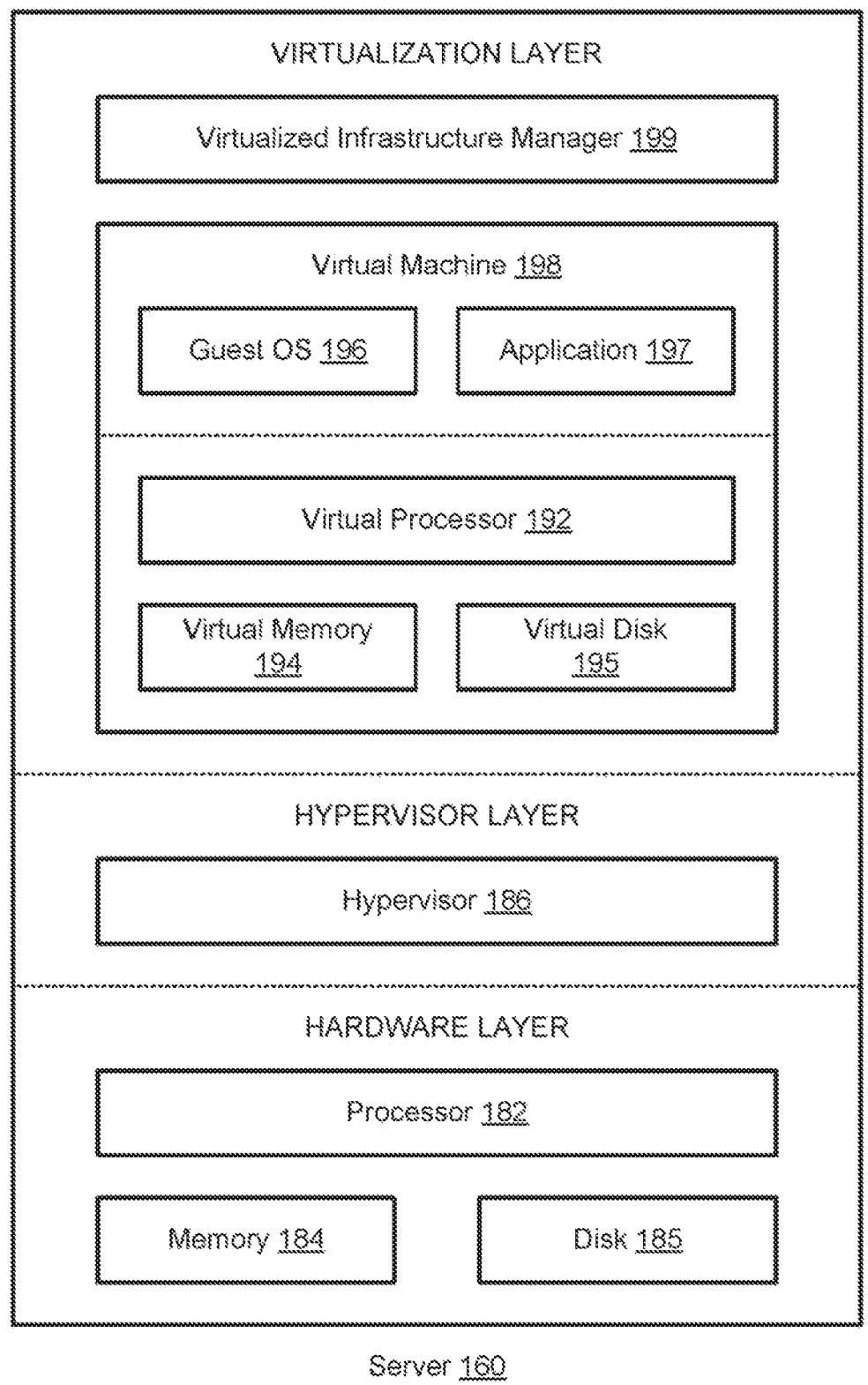
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
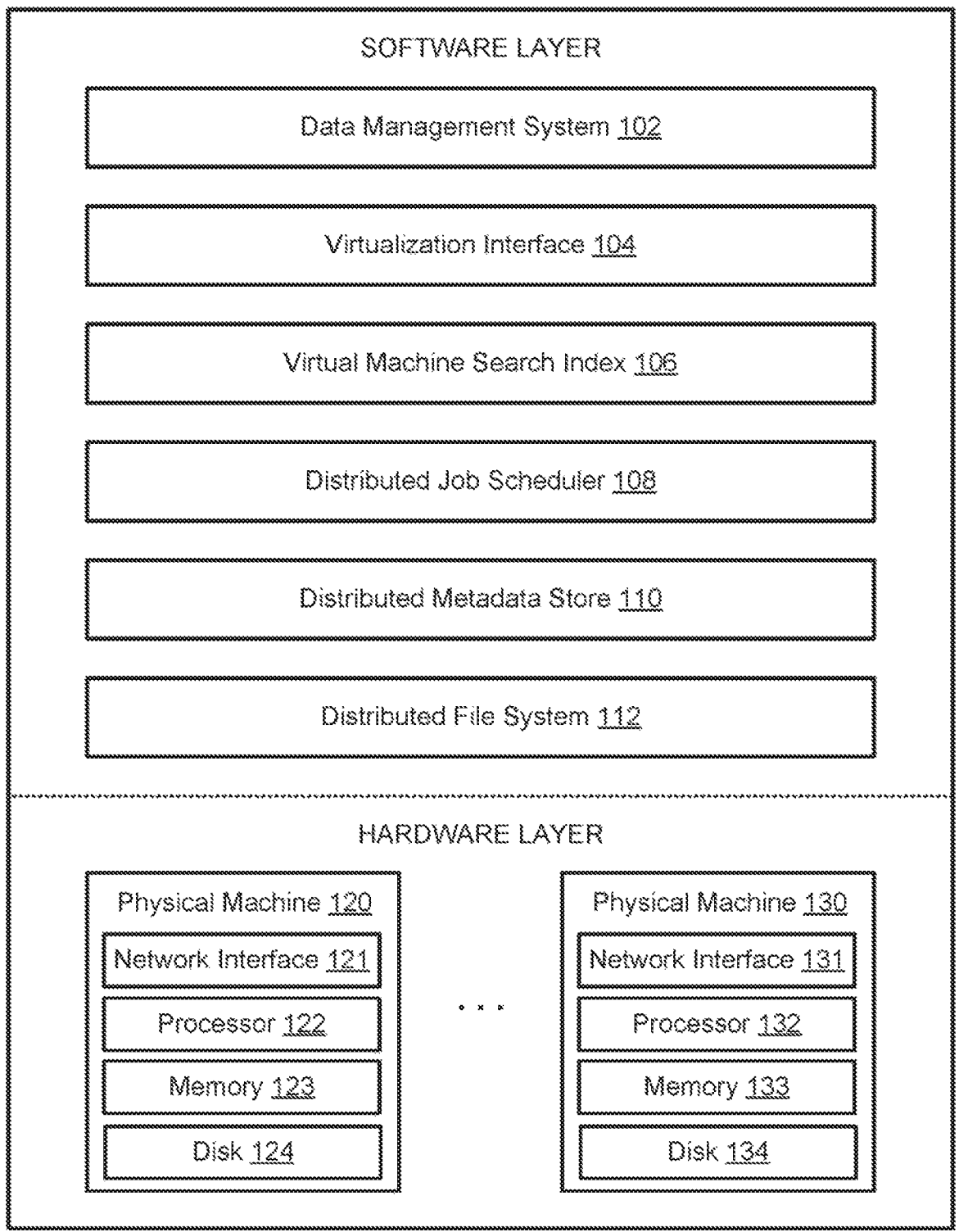
FIG. 1C depicts one embodiment of a storage appliance.

FIG. 1C depicts one embodiment of a storage appliance, such as storage appliance 170 in FIG. 1A The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 ail in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/S1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines.

In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a SSD or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

In some embodiments, versions of a virtual machine may be stored using a full image snapshot stored using a first storage device of a first type (e.g., a first HDD), a first set of reverse incremental files stored using a second storage device of a second type different from the first type (e.g., a first SSD), and a second set of forward incremental files stored using a third storage device of the second type (e.g., a second SSD). As a particular version of the virtual machine may be generated using the full image snapshot stored using the first storage device of the first type and either the first set of reverse incremental files stored using the second storage device or the second set of forward incremental files stored using the third storage device of the second type, the first set of reverse incremental files may not need to be co-located on the same storage device with the second set of forward incremental files.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. Each node may independently determine which tasks to execute. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of lime (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In one example, a RESTful API may provide access to various features. In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
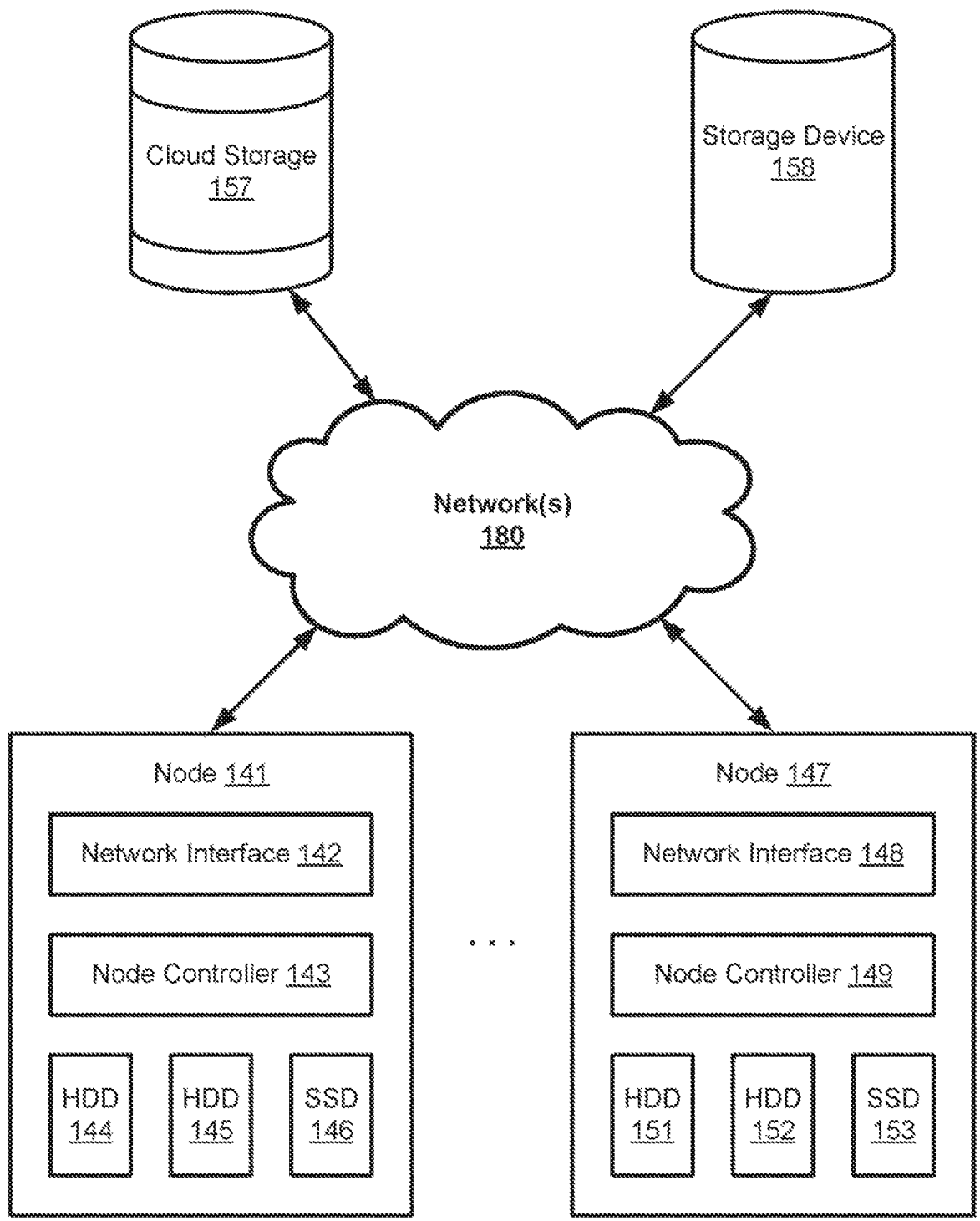
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers. In some cases, node 141 and node 147 may be attached to or supported by a storage rack or a server rack and share a common electrical power connection or a power supply. The storage appliances may include temperature sensors for sensing a temperature of the storage appliance or components therein. The data center or components within the data center may include temperature monitoring circuitry for monitoring temperatures associated with a room, a rack, a server box housing a server, or components of the server (e.g., a semiconductor chip or a processing core used by the server) and detecting when a monitored temperature is above or below a particular threshold (e.g., a temperature associated with a server box is above 85 degrees Celsius).

In one embodiment, node 141 may comprise a first node within a first cluster and node 147 may comprise a second node within a second cluster different from the first cluster. In another embodiment, node 141 may comprise a first node within a first data center and node 147 may comprise a second node within a second data center different from the first data center.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N-1), for a floating IP address (i), the VRRP priority of node(j) may be (j-i) modulo N. In another example, given a number (N) of nodes in a cluster from node(0) to node(N-1), for a floating IP address (i), the VRRP priority of node(j) may be (i-j) modulo N. In these cases, node(j) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

Figures 2A, 2B, 2C:
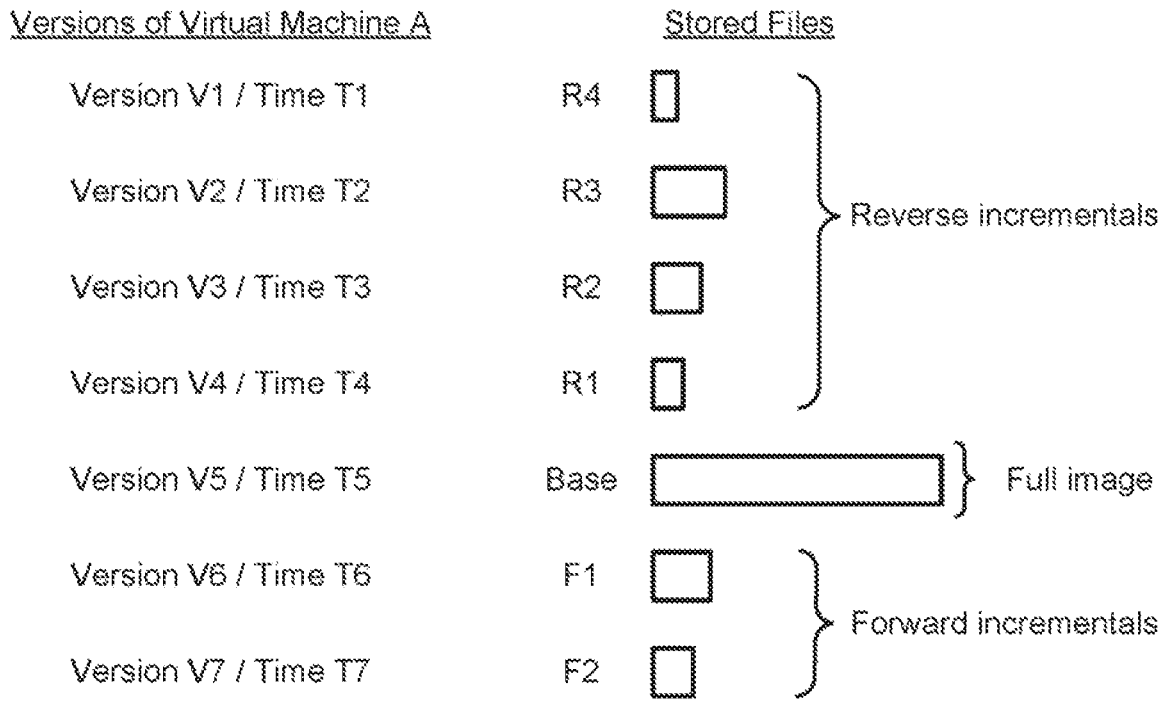
FIGS. 2A-2Q depict various embodiments of sets of files and data structures associated with managing and storing snapshots of virtual machines.
Figures 2D, 2E, 2F:
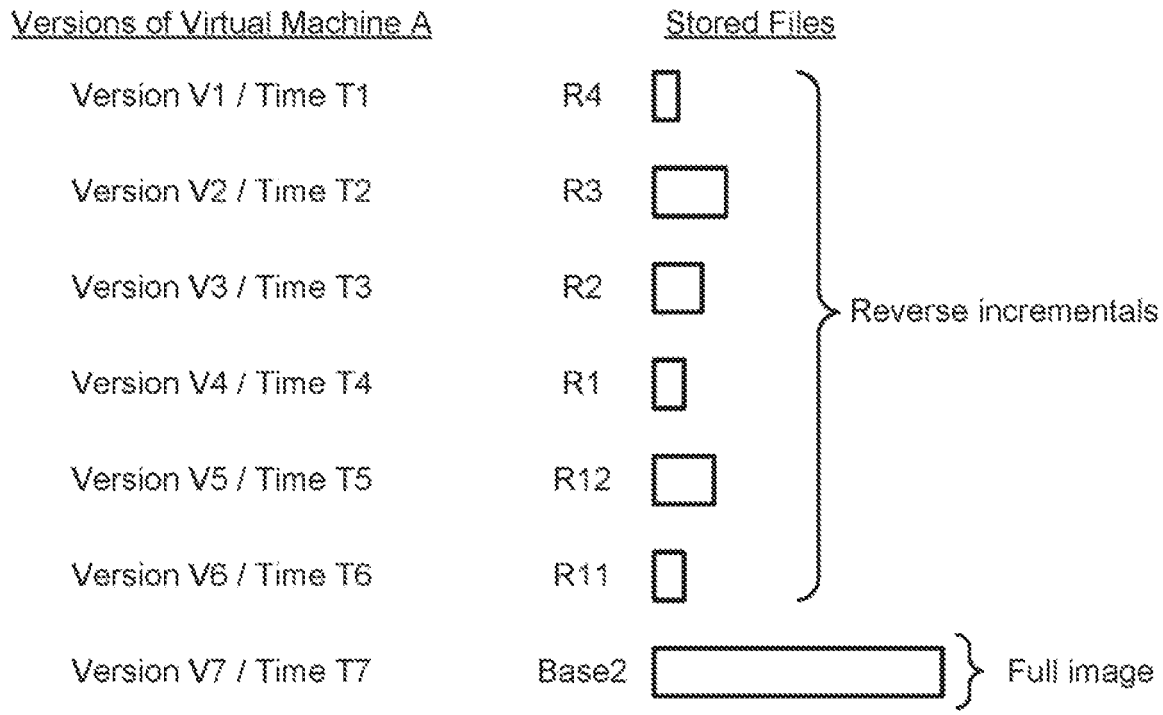
Figures 2G, 2H, 2I:
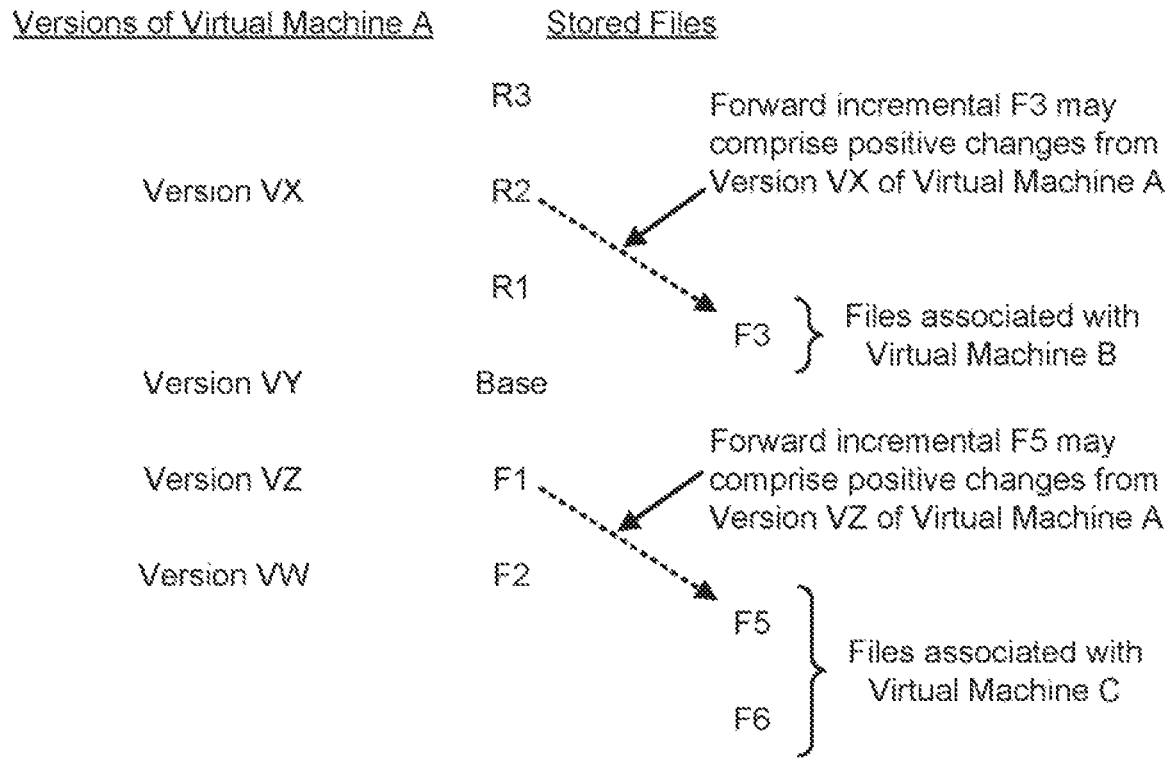
Figures 2J, 2K, 2L:
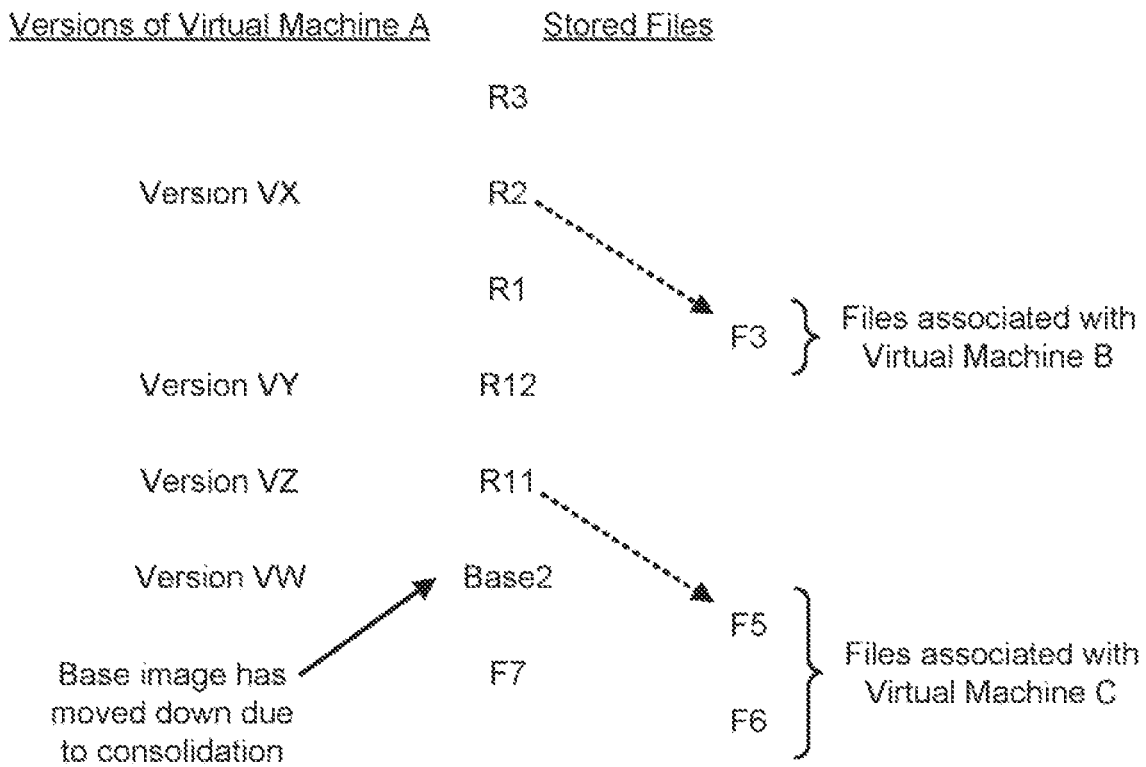
Figures 2M, 2N, 2O:
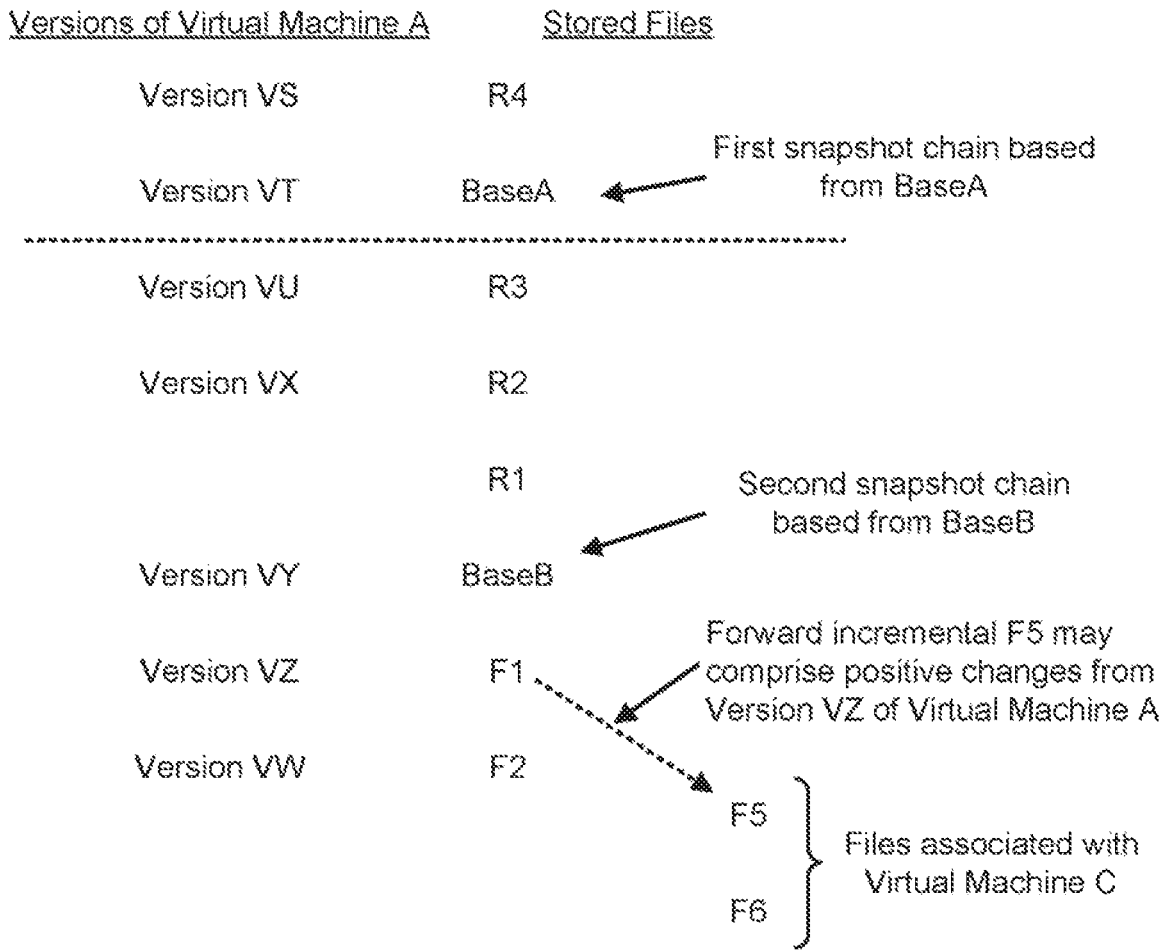
Figures 2P, 2Q:
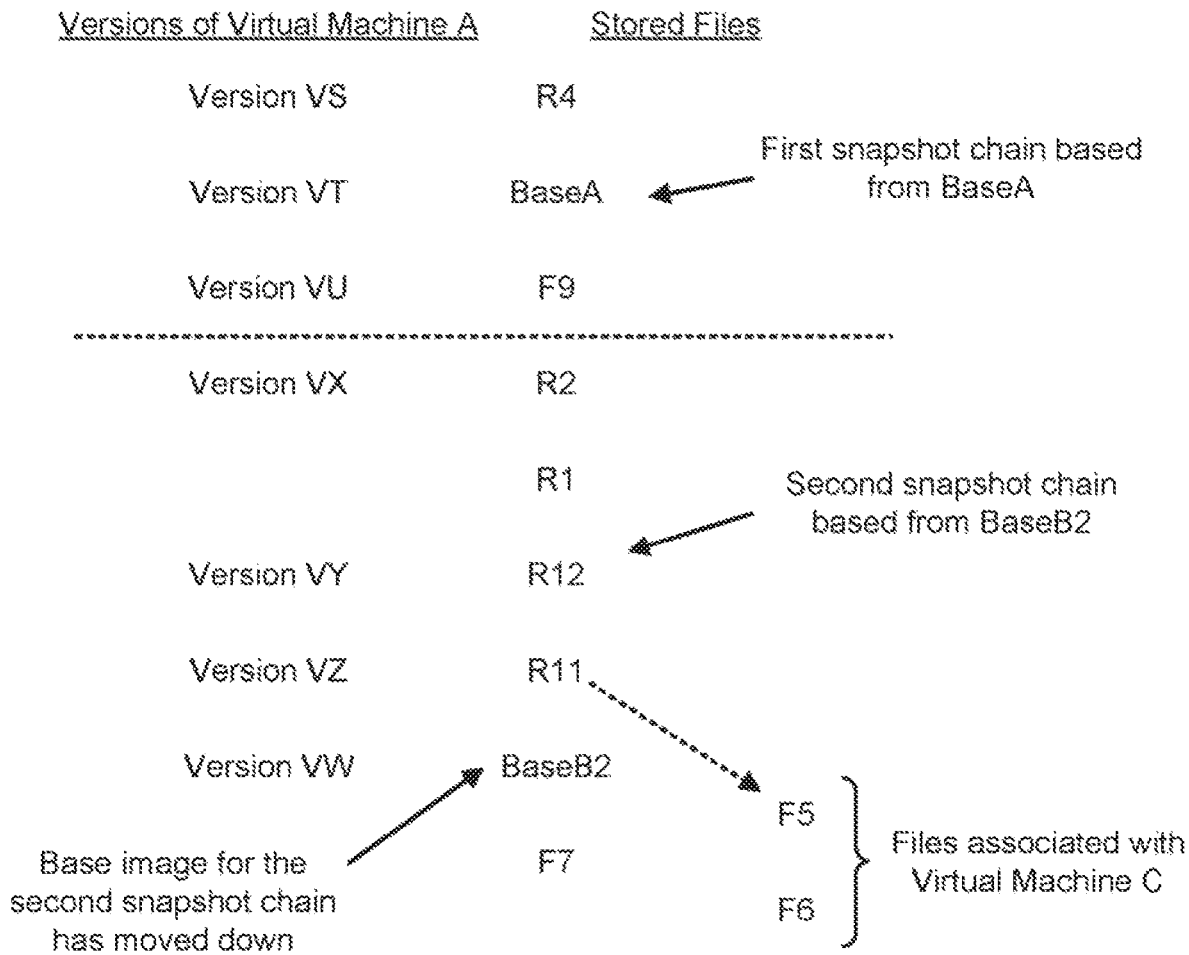

FIGS. 2A-2Q depict various embodiments of sets of files and data structures (e.g., implemented using merged files) associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, die file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path /snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path /snapshots/VM_A/s4/s4.delta), a third pointer (pR2) dial references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a consolidation process has been performed using the first set of files in FIG. 2A. The second set of files may be stored using a distributed file system, such as distributed file system 112 in FIG. 1C. The consolidation process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

In some cases, the consolidation process may be part of a periodic consolidation process that is applied at a consolidation frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a consolidation process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a consolidation process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the consolidation process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of tiles depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshops/VM_A/s3/s3.delta), and a sixth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment. In some cases, the production environment or a server within the production environment may boot up a failed virtual machine directly from a storage appliance, such as storage appliance 170 in FIG. 1C, acting as an NFS datastore to minimize the recovery time to recover the failed virtual machine.

In another embodiment, a secondary workload may request that a particular version of a virtual machine be mounted. In response to the request, a storage appliance, such as storage appliance 170 in FIG. 1C, may clone the particular version of the virtual machine to generate a new virtual machine and then make the new virtual machine available to the secondary workload. Once the new virtual machine has been mounted, data stored within the new virtual machine may be read and/or modified and new data may be written to the new virtual machine without changing data associated with the particular version of the virtual machine stored within the storage appliance.

FIG. 2H depicts one embodiment of a merged file for generating version V1 of Virtual Machine B using the set of files depicted in FIG. 2G, The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some embodiments, prior to consolidation, the generation of version V2 of Virtual Machine C depicted in FIG. 2G may be performed by concurrently reading a full image (Base) corresponding with Version VY of Virtual Machine A from a first storage device while reading forward incremental F1 corresponding with Version VZ of Virtual Machine A and the forward incrementals F5-F6 corresponding with Virtual Machine C from a second storage device different from the first storage device. In one example, the version V2 of Virtual Machine C may be generated by first concurrently reading the base image for Virtual Machine A from a HDD while reading the forward incremental F1 associated with Virtual Machine A and the forward incrementals F5-F6 associated with Virtual Machine C from an SSD. The version V2 of Virtual Machine C may then be generated by applying the forward incrementals F1 and F5-F6 to the full image corresponding with Version VY of Virtual Machine A.

FIG. 2J depicts one embodiment of a set of files associated with multiple virtual machine snapshots after a consolidation process has been performed using the set of files in FIG. 2G. The set of files may be stored using a distributed file system, such as distributed file system 112 in FIG. 1C. The consolidation process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version VI of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some embodiments, after consolidation, the generation of version V2 of Virtual Machine C depicted in FIG. 2J may be performed by concurrently reading a full image (Base2) corresponding with Version VW of Virtual Machine A from a first storage device while reading reverse incremental R11 corresponding with Version VZ of Virtual Machine A and the forward incrementals F5-F6 corresponding with Virtual Machine C from a second storage device different from the first storage device. In one example, the version V2 of Virtual Machine C may be generated by first concurrently reading a full image for Virtual Machine A from a HDD while reading one or more reverse incrementals associated with Virtual Machine A and one or more forward incrementals associated with Virtual Machine C from an SSD. The version V2 of Virtual Machine C may then be generated by applying the one or more reverse incrementals associated with Virtual Machine A and the one or more forward incrementals associated with Virtual Machine C to the full image corresponding with Version VW of Virtual Machine A.

In some cases, a backed-up version of a first virtual machine may be generated by simultaneously reading a full image of a second virtual machine different from the first virtual machine from a first storage device (e.g., a HDD) while reading one or more incrementals associated with the first virtual machine from a second storage device (e.g., an SSD) different from the first storage device. In some cases, a backed-up version of a first virtual machine may be generated by simultaneously reading a full image of a second virtual machine different from die first virtual machine from a first storage device while reading one or more reverse incrementals associated with the second virtual machine and one or more forward incrementals associated with the first virtual machine from a second storage device different from the first storage device.

FIG. 2M depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB), the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via consolidation) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to consolidation may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2N depicts one embodiment of a merged file for generating version VS of Virtual Machine A using the set of files depicted in FIG. 2M. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2O depicts one embodiment of a merged file for generating version VU of Virtual Machine A using the set of files depicted in FIG. 2M. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

FIG. 2P depicts one embodiment of a set of files associated with multiple virtual machine snapshots after a consolidation process has been performed to a snapshot chain using the set of files in FIG. 2M. The set of files may be stored using a distributed file system, such as distributed file system 112 in FIG. 1C. The consolidation process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2Q depicts one embodiment of a merged file for generating version VU of Virtual Machine A using the set of files depicted in FIG. 2P. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), then an existing snapshot chain (e.g., the first snapshot chain depicted in FIG. 2P) may have its chain length extended or snapshots previously assigned to the second snapshot chain may be moved to the existing snapshot chain. For example, the first snapshot chain depicted in FIG. 2M comprises two total snapshots, while the first snapshot chain depicted in FIG. 2P comprises three total snapshots as the snapshot corresponding with version VU of Virtual Machine A has moved from the second snapshot chain to the first snapshot chain.

In some embodiments, the number of snapshots in a snapshot chain may be reduced over time as older versions of a virtual machine are consolidated, archived, deleted, or moved to a different storage domain (e.g., to cloud storage) depending on the data backup and archiving schedule for the virtual machine.

In some embodiments, the maximum incremental chain length, the maximum reverse incremental chain length, or the maximum forward incremental chain length for a snapshot chain may be adjusted over time as nodes or disks are added to or removed from a cluster or upon an update to a data backup and archiving schedule for a virtual machine due to the assignment of a new backup class or a new backup, replication, and archival policy.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

Figure 3A:
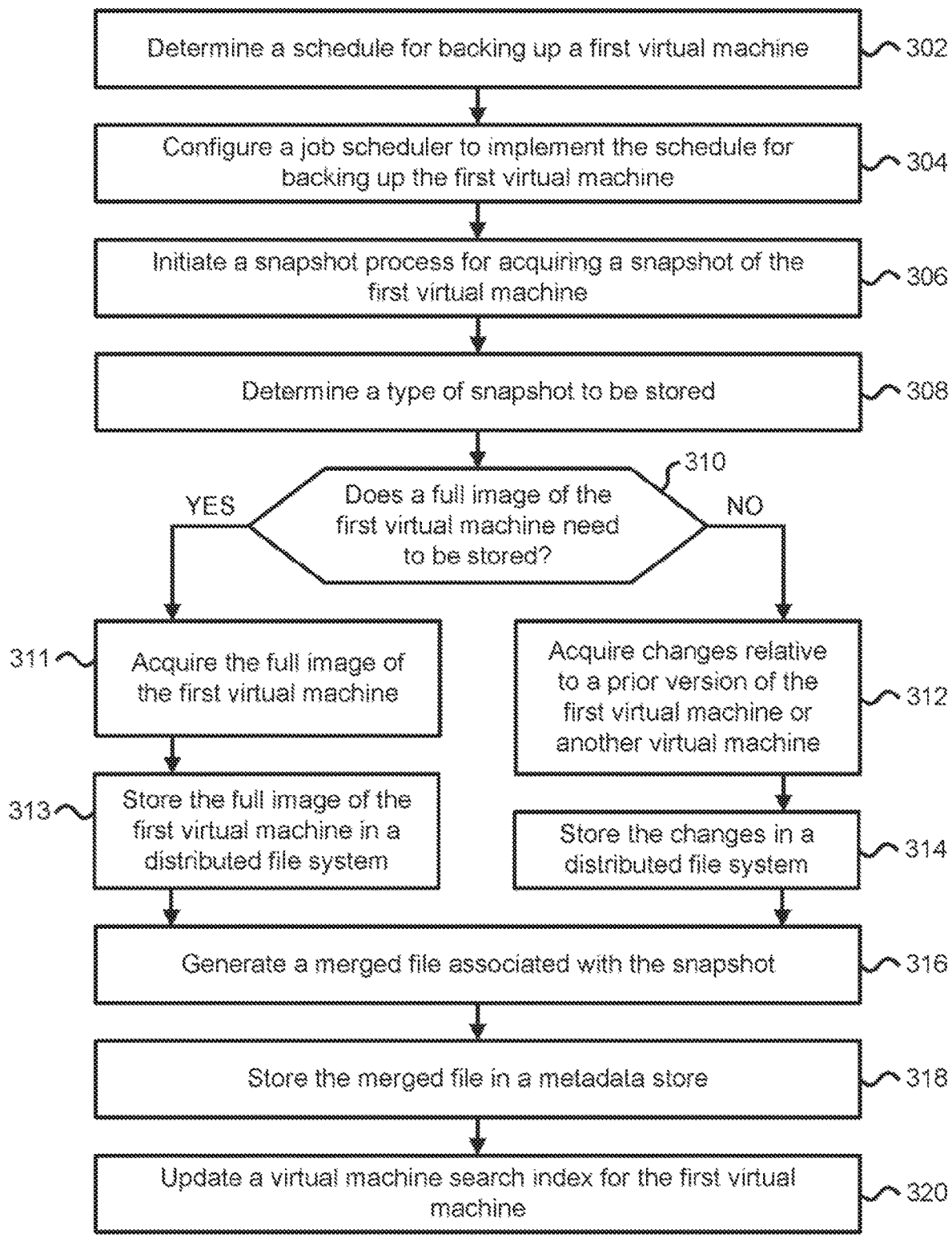
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule, in step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. One embodiment of a process for storing files or data chunks associated with files is described later in reference to FIG. 3C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operation system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
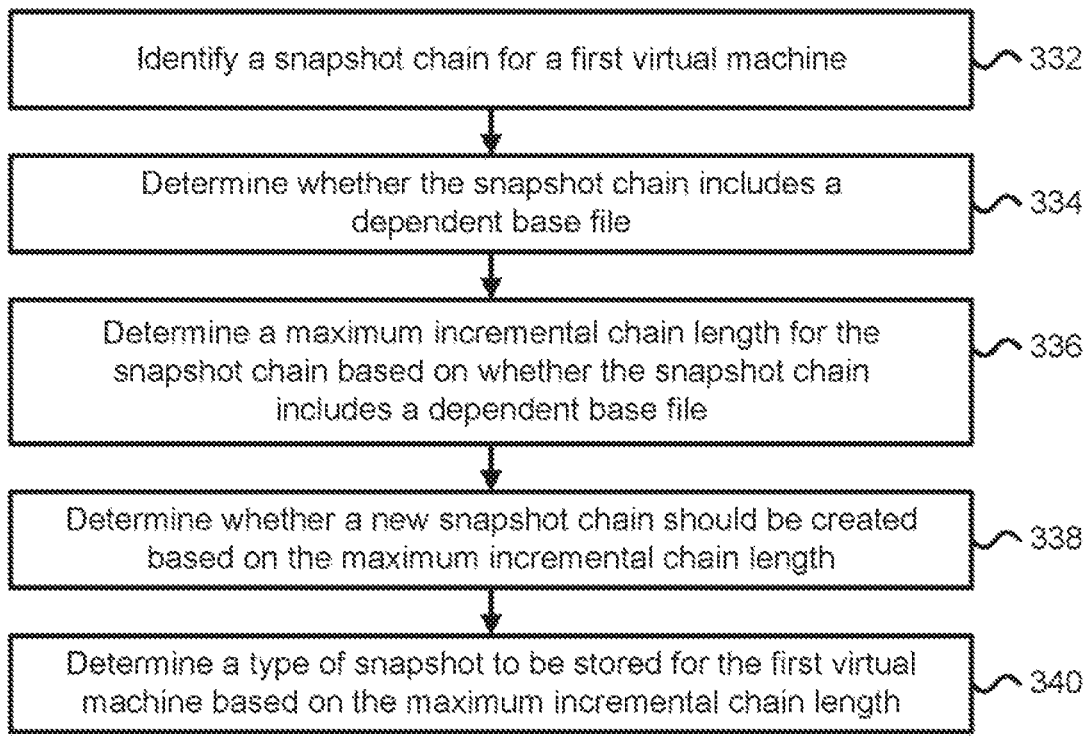
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive. One example of backed-up versions of a virtual machine being stored using one or more snapshot chains is depicted in FIG. 2P in which the versions of Virtual Machine A are stored using a first snapshot chain anchored by full image BaseA and a second snapshot chain anchored by full image BaseB2.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

Figure 3C:
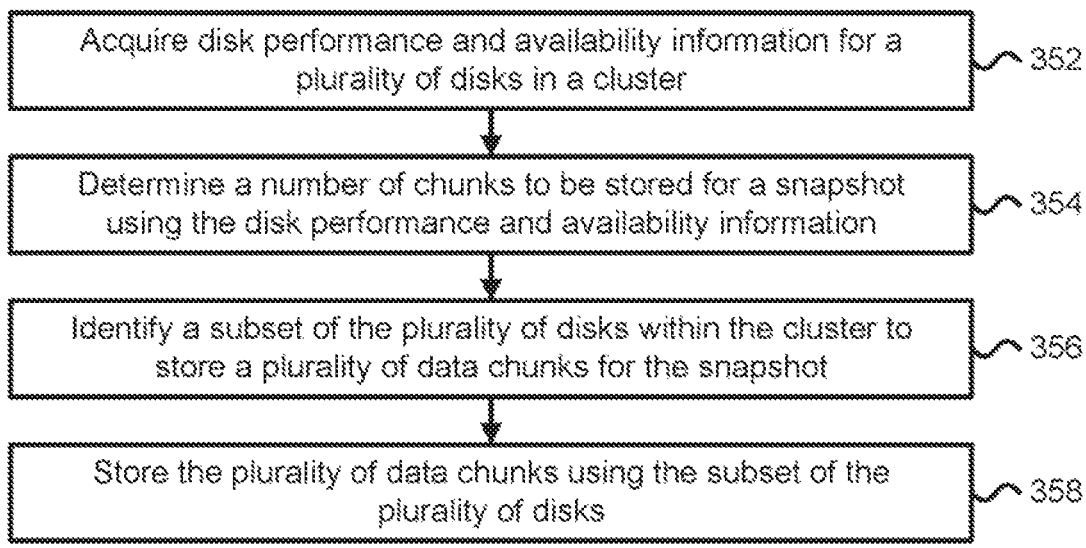
FIG. 3C is a flowchart describing one embodiment of a process fix storing files or data chunks associated with files using a data storage system.

FIG. 3C is a flowchart describing one embodiment of a process for storing files or data chunks associated with files using a data storage system. The process described in FIG. 3C is one example of a process for implementing step 313 in FIG. 3A or for implementing step 314 in FIG. 3A. In one embodiment, the process of FIG. 3C may be performed by a storage appliance, such as storage appliance 170 in FIG. 1A.

In step 352, disk performance and availability information for a plurality of disks in a cluster is acquired. The disk information may include information regarding disk fullness, disk performance (e.g., a historical rate of operations), disk age, and disk history or frequency of failures. In step 354, a number of chunks to be stored for a snapshot is determined using the disk performance and availability information. In one example, the number of chunks to be stored for the snapshot or the chunk size may be adjusted over time based on the disk performance and availability information, the number of disks within the cluster, and/or the type of data protection codes required to obtain the desired level of data protection for the data chunks to be stored. In some cases, the number of data chunks to be stored may be determined based on the type of erasure coding applied. Both the chunk size and/or the number of data chunks to be stored for a given file size may vary over time based on disk availability, disk fullness, and disk performance.

In step 356, a subset of the plurality of disks within the cluster to store a plurality of data chunks for the snapshot is identified. In one example, the subset of disks may comprise three disks out of 100 total disks within the cluster. The plurality of chunks may be generated or determined via data replication or application of erasure coding or parity based data protection techniques to the data to be stored for the snapshot. Erasure coding techniques may generate parity information and encode data fragments for the snapshot such that in the event of a disk failure or a node failure, the original data for the snapshot can be reconstructed. The number of data and parity blocks generated may be configured based on the desired number of disk or node failures to withstand. In step 358, the plurality of data chunks is stored using the subset of the plurality of disks. In one example, a snapshot may correspond with a file that is partitioned into ten segments. Each of the ten segments may be replicated three times and stored using three different disks within a cluster.

In some cases, the topology of the cluster and status information for nodes and disks within the cluster (e.g., information regarding disk fullness, disk performance, and disk age) may be used to identify the subset of disks within the cluster in which to store the plurality of data chunks. The identification of the subset may take into consideration the failure domain distance between the disks of the subset (or another failure tolerance metric), the disk fullness of each disk in the subset, the age of each disk in the subset, and the relationship between the plurality of data chunks to be stored and other data chunks residing on the subset (e.g., whether other data chunks corresponding with the snapshot reside on the subset). A failure domain may comprise a grouping of devices or components within the cluster (e.g., disks) that have correlated failures or that are likely to fail together due to a failure event (e.g., due to a power failure or a network connectivity failure).

Figure 3D:
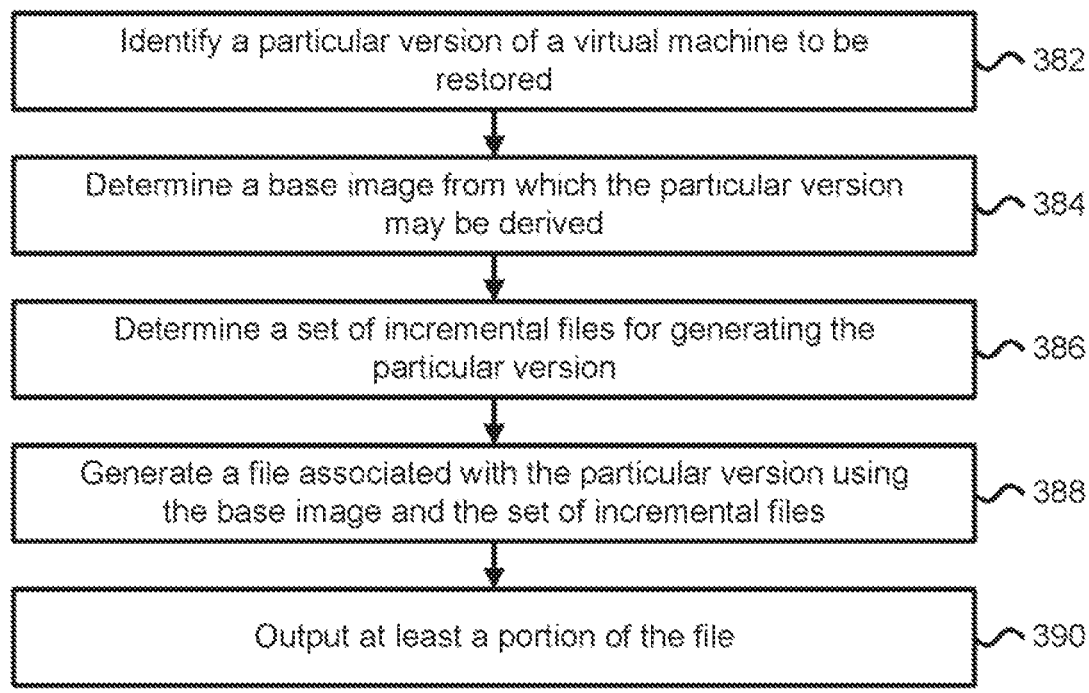
FIG. 3D is a flowchart describing one embodiment of a process for restoring a version of a virtual machine using a data storage system.

FIG. 3D is a flowchart describing one embodiment of a process for restoring a version of a virtual machine using a data storage system. In one embodiment, the process of FIG. 3D may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 388, a file associated with the particular version is generated using the base image and the set of incremental files. The file may be generated by patching the set of incremental files onto the base image.

In one example, referring to FIG. 2G, if the particular version corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. In step 390, at least a portion of the file is outputted. The at least a portion of the file may be transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine (e.g., the second virtual machine may have been backed up prior to snapshots of the virtual machine being acquired and used to generate a dependent base file for the virtual machine). In this case, the base image may comprise the base image for the second virtual machine and the set of incremental files may include a dependent base file that comprises data differences between the base image for the second virtual machine and a previously acquired base image for the virtual machine. Data deduplication techniques may be applied to identify a candidate base image from which a dependent base file may depend and to generate the dependent base file.

FIG. 3E depicts one embodiment of a virtual machine search index, such as virtual machine search index 106 in FIG. 1C. A virtual machine search index for a virtual machine may include a list, table, or other data structure that stores mappings or pointers from different versions of files stored on the virtual machine to different versions of the virtual machine. As depicted, the virtual machine search index includes a list of file versions for File X that are stored on Virtual Machine A, The list of file versions for File X includes Versions X1-X4. Each of the file versions includes a pointer to a particular version of Virtual Machine A that corresponds with the earliest point in time snapshot of Virtual Machine A that includes the file version. For example, version A23 of Virtual Machine A comprises the earliest point in time snapshot of Virtual Machine A that includes version X1 of File X and version A45 of Virtual Machine A comprises the earliest point in time snapshot of Virtual Machine A that includes version X2 of File X. The virtual machine search index also includes a list of file versions for File Y that are stored on Virtual Machine A. The list of file versions for File Y includes a mapping of version Y1 of File Y (saved at time T2) to version A45 of Virtual Machine A and a mapping of version Y2 of File Y (saved at time T8 subsequent to time T2) to version A95 of Virtual Machine A. Version A45 of Virtual Machine A may comprise the $45^{th}$ version of Virtual Machine A.

FIG. 3F depicts one embodiment of a merged file for the version A45 of Virtual Machine A referred to in FIG. 3E. The merged file includes a first pointer (pBase) that references a base image (e.g., via the path /snapshots/VM_A/s100/ s100.full) and other pointers to reverse incremental files (e.g., a pointer to reverse incremental file R55 via the path /snapshots/VM_A/s45/s45.delta). In this case, version A45 of Virtual Machine A may be generated by patching 55 reverse incremental files onto the base image. However, rather than patching the reverse incremental files onto the entire base image, only a portion of the base image associated with a file to be restored (e.g., version X2 of File X) may be acquired from a file system and patched.

FIG. 3G depicts one embodiment of a first portion 362 of the base image referenced by the first pointer (pBase) in FIG. 3F and a second portion 364 of the base image referenced by the first pointer (pBase) in FIG. 3F. In some cases, rather than restoring an entire base image in order to restore a particular version of a file, the first portion 362 of the base image may be restored in order to identify a location of the file within the base image or to identify one or more regions within the base image that store the file. In one example, the first portion 362 of the base image may correspond with one or more file system metadata files. The one or more file system metadata files may store information regarding the type of file system used and information regarding every file and directory on a virtual volume or disk. In some cases, the one or more file system metadata files may be located near the beginning or the end of the base image or near the beginning or the end of a virtual disk partition within the base image. The one or more file system metadata files may include NTFS metadata files, such as an NTFS Master File Table. The NTFS Master File Table may include information for retrieving files from an NTFS partition. The one or more file system metadata files may include a File Allocation Table. The one or more file system metadata files may include information for locating and retrieving files from a virtual disk within the base image (even if due to fragmentation, a file is located in multiple regions within the virtual disk).

Once the first portion 362 of the base image has been acquired and one or more regions within the base image are identified that store the file to be restored, the one or more regions of the base image including the second portion 364 of the base image may be read and patched with data from one or more reverse incremental files in order to generate a portion of a particular version of a virtual machine from which the particular version of the file may be extracted. Thus, a particular version of a file may be quickly extracted by using the virtual machine search index of FIG. 3E to identify a version of a virtual machine that includes the particular version of the file and then restoring only a portion of the version of the virtual machine that includes the particular version of the file. One benefit of extracting the particular version of the file from a small portion of the version of the virtual machine (e.g., 2 MB) rather than from an entire image of the version of the virtual machine (e.g., 20 GB) is that the particular version of the file may be restored in a shorter amount of time.

Figure 3H:
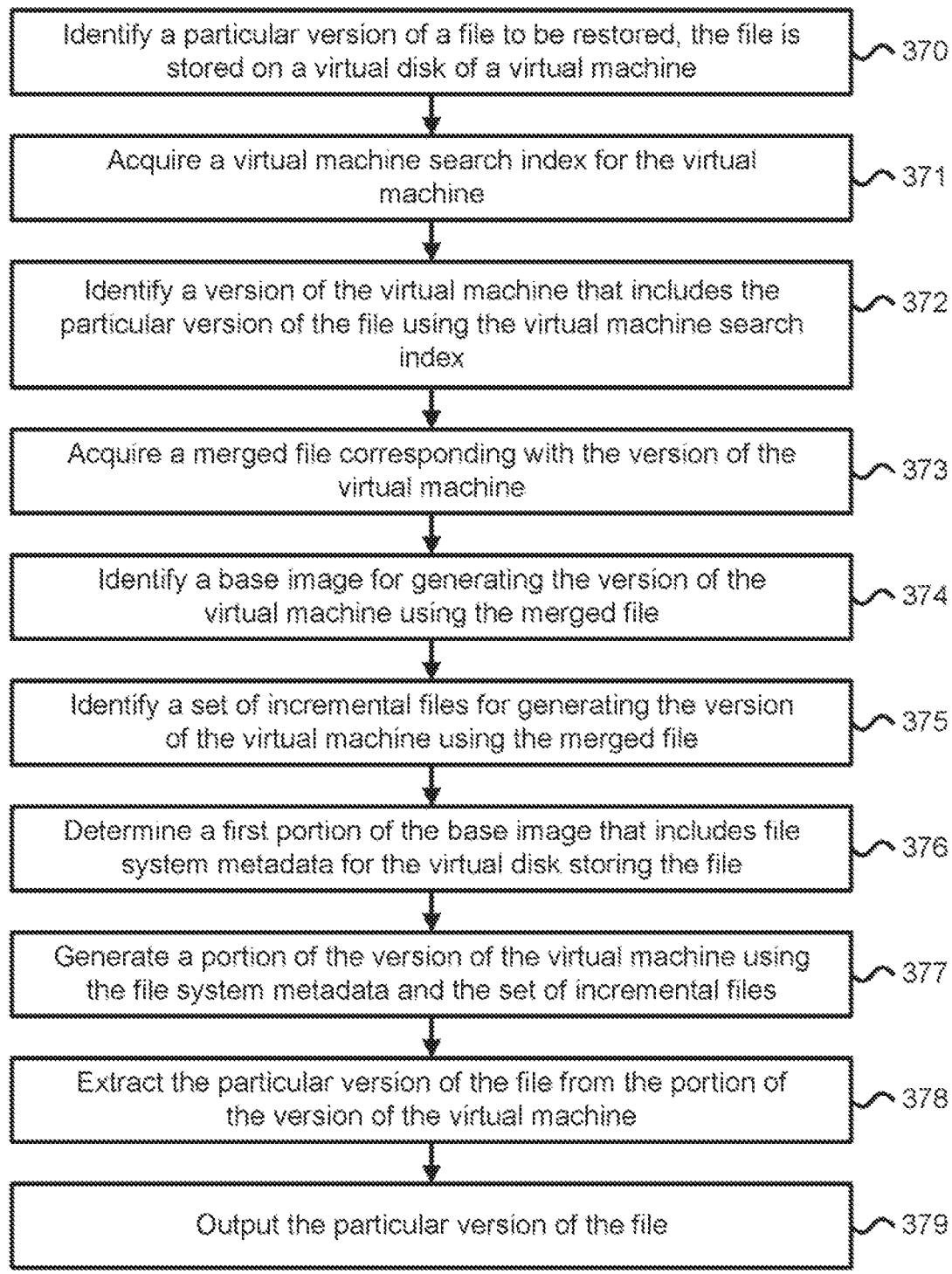
FIG. 3H is a flowchart describing one embodiment of a process for extracting a particular version of a file from one or more snapshots of a virtual machine.

FIG. 3H is a flowchart describing one embodiment of a process for extracting a particular version of a file from one or more snapshots of a virtual machine. In one embodiment, the process of FIG. 3H may be performed by a storage appliance, such as storage appliance 170 in FIG. 1A.

In step 370, a particular version of a file to be restored is identified. The file may be stored on a virtual disk of a virtual machine. The file may comprise or correspond with a database, a spreadsheet, a word processing document, an image file, a video file, a text file, an executable file, an audio file, an electronic message, or an email. The particular version of the file may be selected by an end user of a storage appliance, such as storage appliance 170 in FIG. 1A, using a user interface provided by the storage appliance. In step 371, a virtual machine search index, such as virtual machine search index 106 in FIG. 1C, for the virtual machine is acquired. In step 372, a version of the virtual machine that includes the particular version of the file is identified using the virtual machine search index. In step 373, a merged file corresponding with the version of the virtual machine is acquired. In step 374, a base image for generating the version of the virtual machine is identified using the merged file. In step 375, a set of incremental files for generating the version of the virtual machine is identified using the merged file. In step 376, a first portion of the base image that includes file system metadata for the virtual disk storing the file is determined. In one embodiment, the file system metadata may include information for location and retrieving the file from the virtual disk. In one example, the file system metadata includes NTFS metadata.

In step 377, a portion of the version of the virtual machine is generated using the file system metadata and the set of incremental files. In one embodiment, the portion of the version of the virtual machine is generated by patching the set of incremental files to a second portion of the base image. In another embodiment, the portion of the version of the virtual machine is generated by applying each of the set of incremental files to one or more chunks of data located within the base image. In step 378, the particular version of the file is extracted from die portion of the version of the virtual machine. In step 379, the particular version of the file is outputted. The particular version of the file may be transferred to a computing device, such as computing device 154 in FIG. 1A, or to a virtualization manager, such as virtualization manager 169 in FIG. 1A. In one example, the outputted file may correspond with a database that has been restored to a particular version of the database without having to perform a full restoration of an entire image of a virtual machine.

In some embodiments, a particular version of a data object to be restored may be identified. The particular version of the data object may correspond with a particular point in time instance of the data object (e.g., a third snapshot of an electronic document captured at a third point in time). The data object may be stored on a virtual disk of a virtual machine. The data object may comprise a database, a spreadsheet, a word processing document, an electronic document, an image, a video, a text file, an executable file, an audio recording, an electronic message, or an email. A version of the virtual machine that includes the particular version of the data object may be identified using a virtual machine search index. Once the version of the virtual machine has been identified, metadata associated with the virtual machine (e.g., file system metadata) may be read in order to identify one or more regions within the virtual disk that store the data object. A portion of the version of the virtual machine may then be generated by reading and/or patching only the one or more regions within the virtual disk that store the data object. The particular version of the data object may then be extracted using only the portion of the version of the virtual machine without having to extract or restore an entire image of the version of the virtual machine.

Figure 4A:
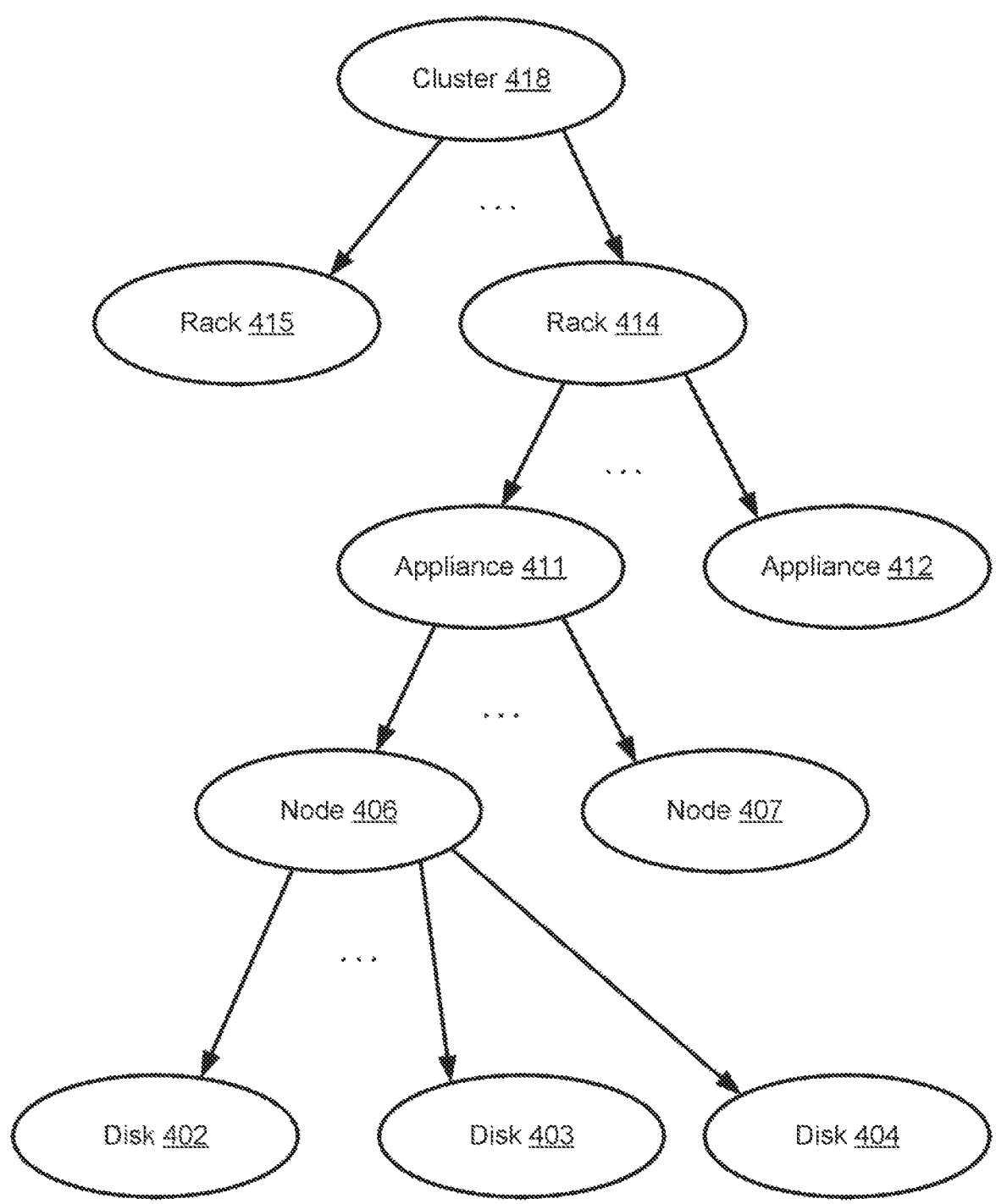
FIG. 4A depicts one embodiment of a hierarchical resource pool.

FIG. 4A depicts one embodiment of a hierarchical resource pool. The hierarchical resource pool 401 may correspond with a directed acyclic graph with vertices corresponding with various components (e.g., disk, nodes, storage appliances, and racks) within a cluster and directed edges from vertices at a higher-level in the hierarchical resource pool (or failure hierarchy) to vertices that would have a high probability of correlated failures with the higher-level vertex at a lower-level in the hierarchical resource pool. A hierarchical resource pool may correspond with a failure domain hierarchy of components within a data center or cluster. As depicted, cluster 418 includes a plurality of disks including disks 402-404. Each of the disks 402-404 may comprise HDD or disks of a first disk type. In some cases, the disks 402-404 may comprise disks of different types. For example, disk 402 may comprise a HDD and disk 403 may comprise a SSD. In some cases, the plurality of disks may comprise four disks or eight disks. Node 406 has directed edges to each of the disks 402-404. In this case, a node failure to node 406 may cause each of disks 402-404 to also fail. Storage appliance 411 includes a plurality of nodes including nodes 406-407. In one example, storage appliance 411 may comprise a data storage appliance such as storage appliance 170 in FIG. 1A. A storage appliance failure (e.g., due to an electrical power failure to the storage appliance) may cause each of the nodes 406-407 to also fail. Rack 414 (e.g., a data center storage rack) may hold or support a plurality of storage appliances including storage appliances 411-412. A rack failure (e.g., due to a cooling system failure or a network switch failure within a data center) may cause each of the storage appliances 411-412 to also fail. The cluster 418 may extend across data storage appliances in numerous racks throughout the data center including racks 414-415.

The hierarchical resource pool 401 may correspond with the topology of the cluster 418 and may be used for determining failure domains at each level of the hierarchical resource pool. In one embodiment, at the disk-level, each of the disks 402-404 may comprise individual failure domains at the disk-level. In another embodiment, disks 402-403 may be assigned to a first failure domain at the disk-level and disk 404 may be assigned to a second failure domain at the disk-level. The disks 402-403 may be placed into the same failure domain due to a having a high probability of correlated failures (e.g., disks 402-403 may be of a similar age, from the same manufacturer, have a similar disk life expectancy, or have a similar MTTF).

In some cases, every node in a distributed cluster may maintain a pool of all available storage resources in the cluster. The pool may include all disks of various media types (e.g., HDD and SSD) and a topology of how the disks are organized into failure domains. In one example, a first node-level failure domain may comprise a first node within a storage appliance and a second node-level failure domain may comprise a second node within the storage appliance; in this case, a failure to the first node may cause each of the disks within the first node to not be accessible or fail. In another example, a first appliance-level failure domain may comprise a first storage appliance and a second appliance-level failure domain may comprise a second storage appliance; in this case, a power failure to the first storage appliance may cause each of the nodes within the first storage appliance to not be accessible or fail.

Figures 4B, 4C:
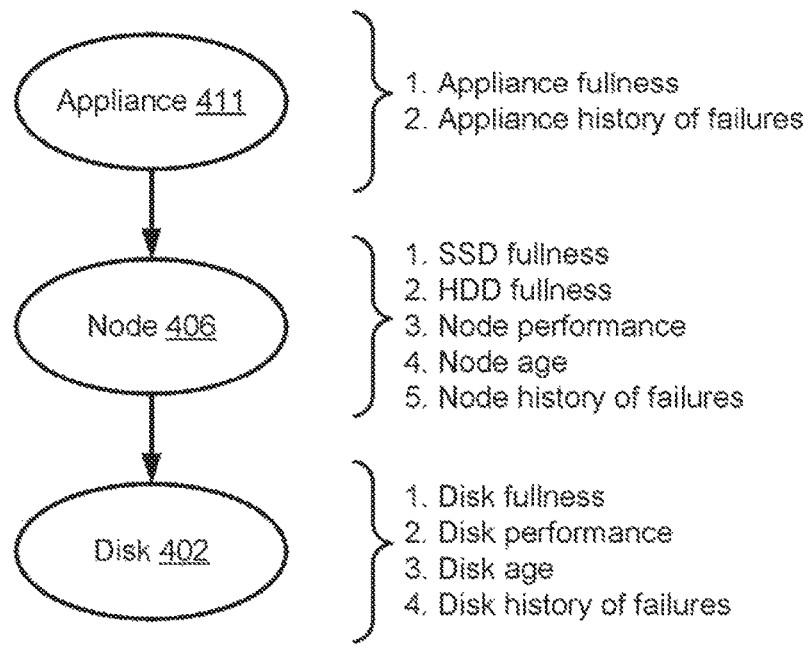
FIG. 4B depicts one embodiment of a portion of the hierarchical resource pool of FIG. 4A with corresponding component status information.
FIG. 4C depicts one embodiment of component status information for a cluster with two storage appliances A1 and A2.

FIG. 4B depicts one embodiment of a portion of the hierarchical resource pool of FIG. 4A with corresponding component status information for various components within the hierarchical resource pool. As depicted, the disk 402 has various component attributes such as disk fullness (e.g., that the disk is 70% full), disk performance (e.g., the input/output operations per second), disk age (e.g., the disk has been in operation or used for storing data for two years), and disk failure history (e.g., a disk failure rate or a number of disk failures for a disk per year). The node 406 has various component attributes such as SSD fullness, HDD fullness, node performance, node age, and node failure history. The storage appliance 411 has various component attributes such as an appliance fullness and appliance failure history. The component status information may vary over time and be updated on a periodic basis, such as every 30 seconds. The component status information may be used to identify the optimum or best set of disks in which to store a plurality of data chunks for a given storage utility function. The component status information may be updated whenever a significant cluster event occurs such as node or disk failure or the addition or deletion of a node or disk from the cluster.

FIG. 4C depicts one embodiment of component status information for a cluster with two storage appliances A1 and A2. As depicted, storage appliance A1 includes two nodes N1 and N2 and has an overall appliance fullness of 50%. Node N1 422 includes three disks X1, X2, and X3 and has an overall node fullness of 75%, 0.2 TB of available SSD storage capacity, and 3 TB of available HDD storage capacity. Node N2 423 includes three disks Y1, Y2, and Y3 and has an overall node fullness of 25%, 0.3 TB of available SSD storage capacity, and 9 TB of available HDD storage capacity. Storage appliance A2 includes node N3 and has an overall appliance fullness of 25%. Node N3 424 includes three disks Z1, Z2, and Z3 and has an overall node fullness of 25%, 0.3 TB of available SSD storage capacity, and 9 TB of available HDD storage capacity.

In some embodiments, a priority list of disks to try for allocation or a flat sequence of disks may be generated using a hierarchical resource pool, such as hierarchical resource pool 401 in FIG. 4A. The flat sequence may be generated by acquiring an updated hierarchical resource pool and recursively interleaving sub-sequences from lower-level failure domain groupings. The lower-level failure domain groupings (e.g., the disk-level failure domains) may be ordered based on a weighted shuffle with weights assigned to each sub-group according to its overall fullness. In one example, for the disks X1, X2, X3, Y1, Y2, Y3, Z1, Z2, and Z3 in the cluster of FIG. 4C, the node 422 may correspond with a first disk-level failure domain and have a first node fullness (e.g., 25% full), the node 423 may correspond with a second disk-level failure domain and have a second node fullness greater than the first node fullness, and the node 424 may correspond with a third disk-level failure domain and have a third node fullness greater than the second node fullness. In this case, the priority list of disks may comprise X1, Y1, Z1, X2, Y2, Z2, X3, Y3, Z3, with X1 being the highest priority disk. The ordering of disks X1, X2, and X3 for the node 422 may be determined based on disk fullness. For example, disk X1 may be the highest priority disk because it has the lowest disk fullness or the highest available capacity.

In another example, for the disks X1, X2, X3, Y1, Y2, Y3, Z1, Z2, and Z3 in the cluster of FIG. 4C, the node 422 may correspond with a first disk-level failure domain and X3 may be identified as a preferred disk, the node 423 may correspond with a second disk-level failure domain and Y2 may be identified as a preferred disk, and the node 424 may correspond with a third disk-level failure domain and Z1 and Z2 may be identified as preferred disks. In this case, the priority list of disks may comprise Z1, X3, Y2, Z2, X1, Y1, Z3, X2, Y3, with Z1 being the highest priority disk.

FIGS. 4D-4G depict various embodiments of the nodes 422-424 of FIG. 4C and their corresponding hard disks in which three disks have been identified for storing three data chunks, the three disks identified in each of FIGS. 4D-4G may be identified based on the three best scoring disks using the storage utility functions depicted in FIGS. 4H-4I.

FIG. 4H depicts one embodiment of a storage utility function or model for scoring a particular disk for allocation. The score for DiskA may comprise the sum of various weighted factors. One or more weighting coefficients not depicted for the various factors may be adjusted over time based on an applied backup policy. As depicted, the score for DiskA comprises the sum of a preferred disk factor 480 that outputs a greater value if DiskA stores other data related to the data chunks to be stored (e.g., DiskA stores other chunks corresponding with snapshots of a virtual machine), a first failure domain distance 481 between DiskA and a second proposed disk DiskB, a second failure domain distance 482 between DiskA and a third proposed disk DiskC, a risk of failure factor 483 that outputs a greater value if DiskA exceeds a particular disk age or exceeds a particular failure rate, a fullness factor 484 that outputs a greater value as DiskA's available capacity decreases, and a performance penalty factor 485 that outputs a greater value if the number of input/output operations per second falls below a threshold performance value. In some cases, the preferred disk factor 480 may take into account the number of related chunks stored on a disk. For example, the greater the number of related chunks on a disk, the greater the outputted preferred disk factor 480. The score generated for DiskA will be higher when DiskA comprises one of a set of preferred disks (e.g., the data chunks would be co-located with related data) and the failure domain distances between the three disks to be allocated is maximized. The score generated for DiskA will be lower when DiskA fills up or has limited available capacity, has a higher risk of a disk failure, or has reduced disk read or write performance.

FIG. 4I depicts one embodiment of a storage utility function or model for scoring a total disk allocation. As depicted, chunk allocation score 487 comprises the sum of individual disk scores including the disk score 486 for DiskA generated using the storage utility function depicted in FIG. 4H. In one embodiment, chunk allocation scores for each combination of three disks may be generated and the disk allocation may correspond with the highest chunk allocation score. For example, choosing three disks to try for allocation out of nine total disks would require generating 84 chunk allocation scores. In another embodiment, a first disk may be assigned due to having the highest individual score and the other two disks may be determined by enumerating the remaining combinations. In this case, choosing two disks out of the eight remaining disks after one of the disks has been selected would require generating 28 chunk allocation scores. Various scoring heuristics may also be applied when the number of combinations is large.

Figure 4D:
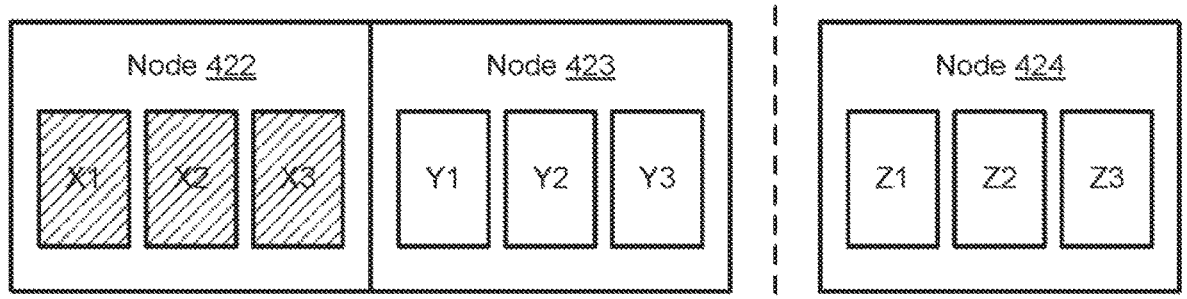
FIGS. 4D-4G depict various embodiments of possible hard disk allocations in which three disks have been identified for storing three data chunks.

Referring to FIG. 4D, the three disks that have been selected or identified for storing three data chunks comprise the three disks X1, X2, and X3 controlled by node 422. In this case, although the failure domain distances between the three disks is not high, other factors, such as the ability to co-locate related data or that the disks associated with nodes 423-424 may have been near capacity, have outweighed the reduced failure domain distances.

Figure 4E:
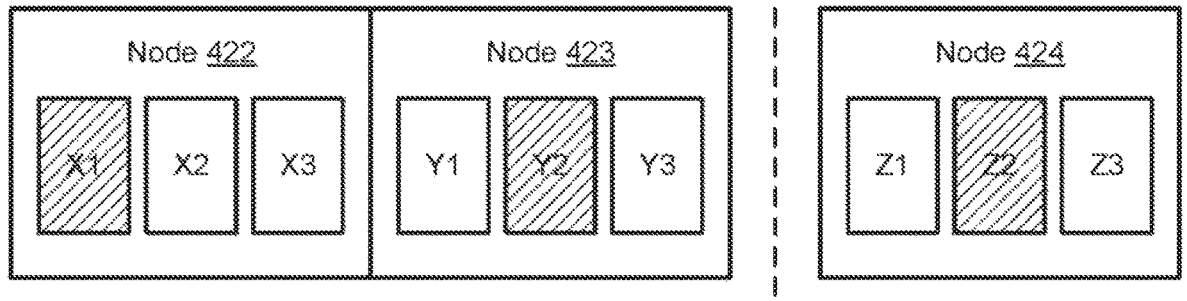

Referring to FIG. 4E, the three disks X1, Y2, and Z2 that have been selected or identified for storing three data chunks comprise one disk from each of the three nodes 422-424. In this case, the failure domain distances between the three disks identified may be maximized.

Figure 4F:
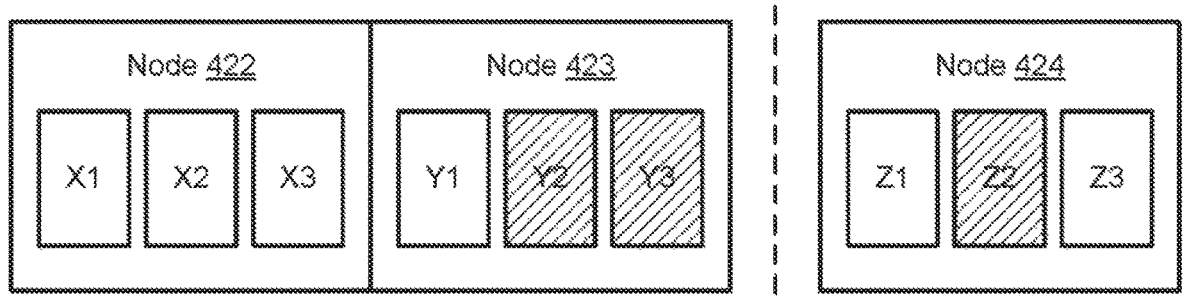

Referring to FIG. 4F, the three disks Y2, Y3, and Z2 that have been selected or identified for storing three data chunks comprise one disk from node 424 and two disks from node 423. In this case, the three disks identified for allocation reside on nodes with the lowest fullness (or greatest available capacity) as both node 423 and node 424 have been assigned a node fullness of 25%.

Figure 4G:
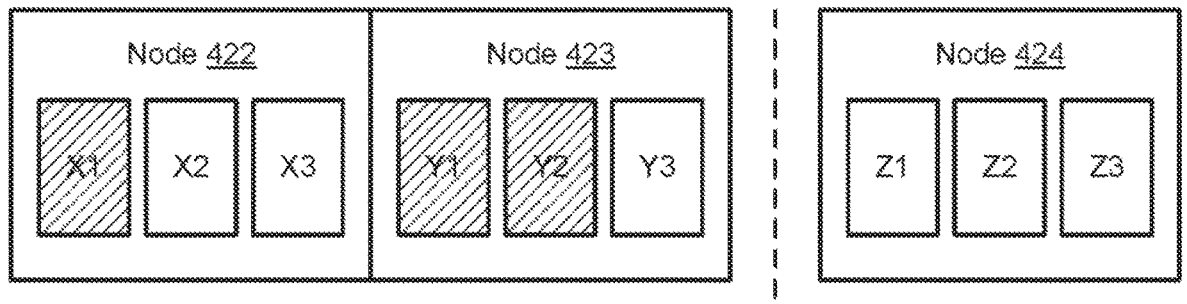

Referring to FIG. 4G, the three disks X1, Y1, and Y2 that have been selected or identified for storing three data chunks comprise one disk from node 422 and two disks from node 423. In this case, the three disks identified for allocation reside on nodes within the same storage appliance A1.

In one embodiment, a cluster of distributed nodes, such as nodes 141 and 147 in FIG. 1D, may comprise a plurality of network connected nodes that each include a plurality of disks (e.g., each node may include three HDDs and one SSD). The plurality of network connected nodes may comprise part of an integrated data management and storage system that presents itself as a unified storage system. The integrated data management and storage system may apply n-way mirroring or erasure coding to generate replicated data or to create data redundancy prior to storing the redundant data. The integrated data management and storage system may capture a snapshot of a real or virtual machine, generate a plurality of data chunks using the snapshot (e.g., via replication or application of erasure coding techniques), identify a set of disks within the cluster of distributed nodes for allocation, and write the plurality of data chunks to the set of disks. In one example, a snapshot may correspond with a forward incremental file and the forward incremental file may be divided into a plurality of segments that are each replicated and stored (e.g., three identical copies of each of the segments may be stored using three different disks or three different nodes within a cluster).

FIG. 4J is a flowchart describing one embodiment of a process for identifying a set of disks within a cluster and then storing a plurality of data chunks into the set of disks such that the placement of the plurality of data chunks within the cluster optimizes failure tolerance and storage system performance for the cluster. In one embodiment, the process of FIG. 4J may be performed by a storage appliance, such as storage appliance 170 in FIG. 1A.

In step 442, a plurality of data chunks associated with a snapshot is generated. The snapshot may correspond with a full image snapshot or an incremental snapshot of a virtual machine. The plurality of data chunks may be generated by segmenting a file corresponding with a full image snapshot or an incremental snapshot and applying replication or parity based data protection techniques to the segments. In one example, erasure coding may be applied to the file in order to generate the plurality of data chunks.

In step 444, a set of preferred disks out of a plurality of disks within a cluster is identified based on the snapshot. In one example, the set of preferred disks may comprise each disk within the cluster that stores data related to the snapshot. In another example, the set of preferred disks may comprise each disk within the cluster that stores data related to one or more snapshots of a particular virtual machine. In some cases, the set of preferred disks may comprise each disk within the cluster that stores data for the virtual machine and is of the same incremental type as the snapshot. For example, the snapshot may correspond with a forward incremental for a virtual machine and the set of preferred disks may comprise each disk within the cluster that stores data for other forward incrementals of the virtual machine. In one embodiment, the snapshot may comprise one snapshot of a snapshot chain and the set of preferred disks may comprise each disk within the cluster that stores data for the snapshot chain. In some cases, the set of preferred disks may be determined based on data storage locations associated with other data chunks within the same snapshot of a virtual machine or within the same snapshot chain as the snapshot (e.g., data chunks corresponding with related incremental files for the virtual machine).

In step 446, disk status information for the plurality of disks is acquired. The disk status information may include disk ages, disk failure rates, disk MTTF values, and disk fullnesses or available capacities. In step 448, a plurality of failure domains for the plurality of disks is determined using the disk status information. The plurality of failure domains may correspond with failure domain groupings at the disk level. In one embodiment, the failure domain groupings at the disk level may be determined based on disk age. For example, all disks between 1-6 months old may be assigned to a first grouping of disks, all disks between 6-12 months old may be assigned to a second grouping of disks, and all disks between 1-3 years may be assigned to a third grouping of disks. In another embodiment, the failure domain groupings at the disk level may be determined based on disk failure rates or disk MTTF values. In one example, all disks with a MTTF between 400K and 600K operating hours may be assigned to a first grouping of disks, all disks between 600K and 800K operating hours may be assigned to a second grouping of disks, and all disks between 800K and 1.2M operating hours may be assigned to a third grouping of disks. In one embodiment, the disks in a cluster may be ranked by disk age or disk MTTF values and then partitioned into ten groupings.

In some embodiments, the failure domain groupings within a cluster may be dynamically adjusted over time due to changes in disk ages, disk failure rates, and disk MTTF values. The failure domain groupings at the disk level may be determined based on disk age and/or disk MTTF values. In one embodiment, the disks in a cluster may be ranked or ordered by disk age or disk MTTF values and then partitioned into a number of groupings corresponding with the failure domain groupings (e.g., partitioned into ten groupings of disks).

In step 450, a set of disks out of the plurality of disks within the cluster in which to store the plurality of data chunks is identified based on the set of preferred disks and the plurality of failure domains. In one example, a set of three disks out of nine disks within the cluster may be identified. In one embodiment, a priority list of disks to try for allocation may be generated using a hierarchical resource pool, such as hierarchical resource pool 401 in FIG. 4A, and the identification of the set of disks may correspond with the top three disks in the priority list of disks. The priority list of disks may be generated by recursively interleaving subsequences of lower-level failure domain groupings. In another embodiment, the set of disks may be identified by determining the plurality of failure domains using the topology of the cluster and the disk status information and then identifying the optimum or best set of disks in which to store the plurality of data chunks that maximizes a given total disk allocation function, such as the total disk allocation function depicted in FIG. 4I. The set of disks may correspond with a particular assignment of three disks that maximizes the total disk allocation function. In some cases, scores for all three disk combinations within the cluster may be computed and the particular assignment may correspond with the three disk combination with the highest total disk allocation score.

In some embodiments, the total disk allocation score may take into consideration the failure domain distances between the disks of the set of disk, the disk fullness of each disk in the set of disks, the age of each disk of the set of disks, and/or the relationship between the data chunks to be stored and other data chunks residing on the set of disks (e.g., whether other data chunks corresponding with a particular snapshot or a snapshot chain reside on the set of disks).

In step 452, the plurality of data chunks is written to the set of disks. The plurality of data chunks may be written concurrently to the set of disks. In some cases, each data chunk of the plurality of data chunks may be written in parallel to a different disk of the set of disks. For example, the plurality of data chunks may comprise three data chunks and all three data chunks may be written into three different disks at the same time or concurrently.

Figure 4K:
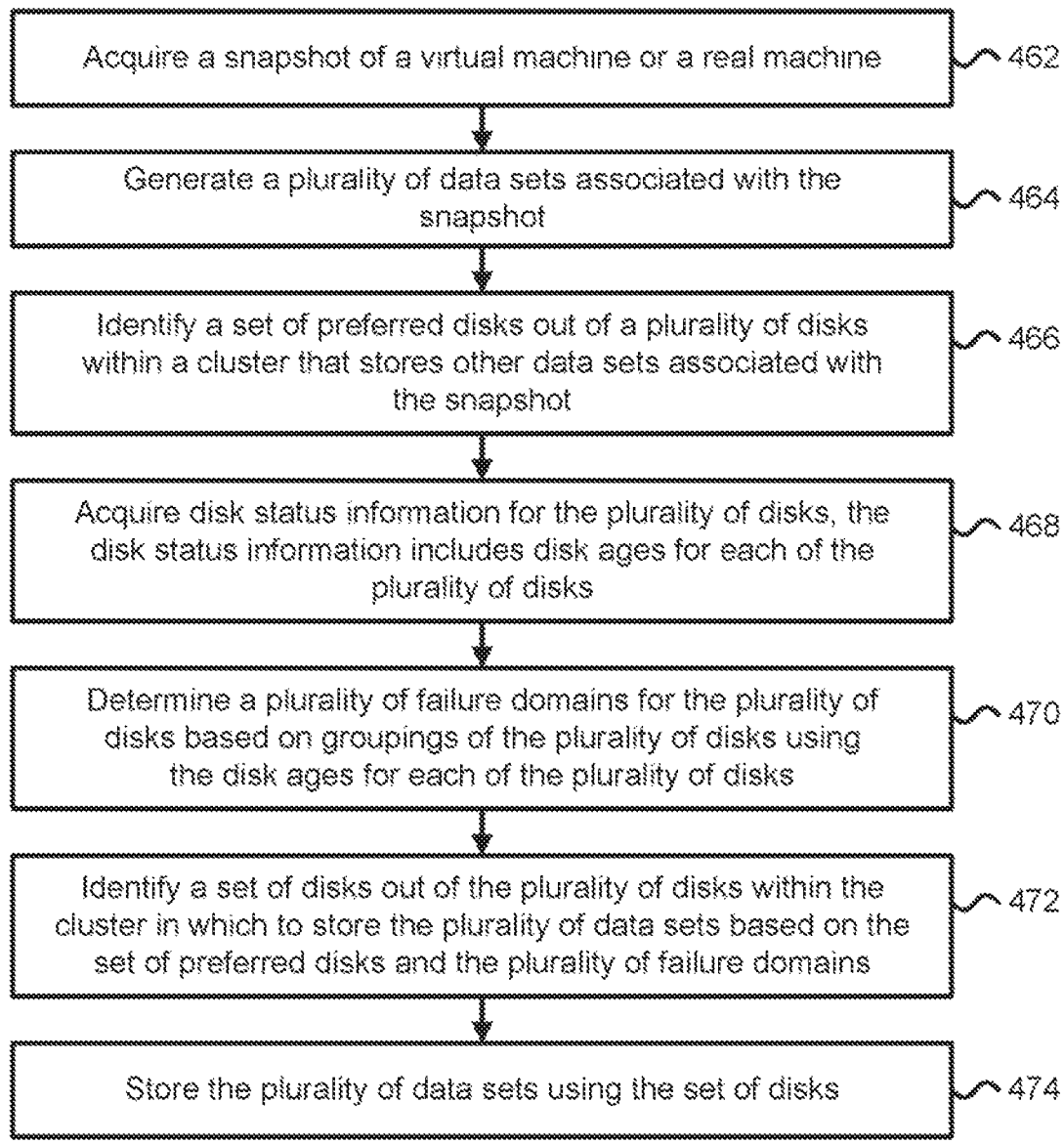
FIG. 4K is a flowchart describing another embodiment of a process for identifying a set of disks within a cluster and then storing a plurality of data chunks into the set of disks such that the placement of the plurality of data chunks within the cluster optimizes failure tolerance and storage system performance for the cluster.

FIG. 4K is a flowchart describing an alternative embodiment of a process for identifying a set of disks within a cluster and then storing a plurality of data chunks (or data sets) into the set of disks such that the placement of the plurality of data chunks within the cluster optimizes failure tolerance and storage system performance for the cluster. In one embodiment, the process of FIG. 4K may be performed by a storage appliance, such as storage appliance 170 in FIG. 1A.

In step 462, a snapshot of a virtual machine or a real machine is acquired. In step 464, a plurality of data sets associated with the snapshot is generated. The plurality of data sets may be generated via replication of data corresponding with the snapshot or application of erasure coding techniques to the data corresponding with the snapshot. In step 466, a set of preferred disks out of a plurality of disks within a cluster that stores other data sets associated with the snapshot is identified. In step 468, disk status information for the plurality of disks is acquired. The disk status information may include disk ages for each of the plurality of disks. In step 470, a plurality of disk-level failure domains for the plurality of disks is determined based on groupings (or sub-groupings) of the plurality of disks using the disk ages for each of the plurality of disks. The plurality of failure domains may be determined by grouping subsets of the plurality of disks using the disk ages for the plurality of disks or disk age ranges for the plurality of disks. In step 472, a set of disks out of the plurality of disks within the cluster in which to store the plurality of data sets is identified based on the set of preferred disks and the plurality of failure domains. In step 474, the plurality of data sets is stored using the set of disks.

One embodiment of the disclosed technology includes generating a plurality of data chunks associated with a snapshot of a real or virtual machine, identifying a set of preferred disks out of a plurality of disks within a cluster that stores other data chunks associated with the real or virtual machine, acquiring disk status information for the plurality of disks within the cluster, determining a plurality of failure domains for the plurality of disks using the disk status information, identifying a set of disks out of the plurality of disks within the cluster in which to store the plurality of data chunks based on the set of preferred disks and the plurality of failure domains, and writing the plurality of data chunks to the set of disks.

One embodiment of the disclosed technology includes a memory (e.g., a volatile or non-volatile memory) in communication with one or more processors. The memory configured to store a snapshot of a real or virtual machine. The one or more processors configured to generate a plurality of data sets associated with the snapshot and identify a set of preferred disks out of a plurality of disks within a cluster that stores other data sets associated with the real or virtual machine. The one or more processors configured to acquire disk status information for the plurality of disks within the cluster and determine a plurality of failure domains for the plurality of disks based on the disk status information. The one or more processors configured to identify a set of disks out of the plurality of disks within the cluster in which to store the plurality of data sets based on the set of preferred disks and the plurality of failure domains. The one or more processors configured to cause the plurality of data sets to be concurrently written to the set of disks.

One embodiment of the disclosed technology comprises one or more non-transitory storage devices containing processor readable code for programming one or more processors to perform a method for operating a data management system. The processor readable code comprising processor readable code configured to acquire a plurality of data chunks associated with a snapshot of a virtual machine, processor readable code configured to identify a set of preferred disks out of a plurality of disks within a cluster that stores other data chunks associated with the virtual machine, processor readable code configured to acquire disk status information for the plurality of disks within the cluster, the disk status information includes disk ages for the plurality of disks, processor readable code configured to determine a plurality of failure domains for the plurality of disks using the disk status information to group the plurality of disks into the plurality of failure domains based on the disk ages for the plurality of disks, processor readable code configured to identify a set of disks out of the plurality of disks within the cluster in which to store the plurality of data chunks using the set of preferred disks and the plurality of failure domains, and processor readable code configured to store the plurality of data chunks using the set of disks.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
    acquiring a first snapshot of a real or virtual machine;
    generating a first plurality of data sets using the first snapshot of the real or virtual machine;
    acquiring disk ages for a plurality of disks at a first point in time;
    determining a plurality of estimated times to failure for the plurality of disks at the first point in time using the disk ages for the plurality of disks at the first point in time;
    identifying a first subset of the plurality of disks less than all of the disks of the plurality of disks using the plurality of estimated times to failure for the plurality of disks at the first point in time;
    identifying a second subset of the plurality of disks different from the first subset of the plurality of disks using the plurality of estimated times to failure for the plurality of disks at the first point in time;
    storing a first data set of the first plurality of data sets using the first subset of the plurality of disks;
    storing a second data set of the first plurality of data sets using the second subset of the plurality of disks;
    acquiring a second snapshot of the real or virtual machine subsequent to acquiring the first snapshot of the real or virtual machine;
    generating a second plurality of data sets using the second snapshot of the real or virtual machine;
    acquiring disk ages for the plurality of disks at a second point in time subsequent to the first point in time;
    determining a plurality of estimated times to failure for the plurality of disks at the second point in time using the disk ages for the plurality of disks at the second point in time;
    identifying a third subset of the plurality of disks less than all of the disks of the plurality of disks using the plurality of estimated times to failure for the plurality of disks at the second point in time, wherein the first subset of the plurality of disks is different from the third subset of the plurality of disks; and
    storing a third data set of the second plurality of data sets using the third subset of the plurality of disks.

2. The method of claim 1, wherein:
the identifying the first subset of the plurality of disks includes identifying a first grouping of the plurality of disks with an estimated time to failure associated with a first time period; and
the identifying the second subset of the plurality of disks includes identifying a second grouping of the plurality of disks with an estimated time to failure associated with a second time period different from the first time period.

3. The method of claim 2, wherein:
the first grouping of the plurality of disks has an estimated time to failure between one year and two years and the second grouping of the plurality of disks has an estimated time to failure of less than one year.

4. The method of claim 2, wherein:
the first time period does not overlap with the second time period.

5. The method of claim 1, further comprising:
concurrently writing a third data chunk of the third data set to a third disk of the plurality of disks and writing a fourth data chunk of a fourth data set to a fourth disk of the plurality of disks.

6. The method of claim 5, wherein: the third disk comprises a third hard-disk drive; and the fourth disk comprises a fourth hard-disk drive.

7. The method of claim 1, wherein:
the generating the first plurality of data sets using the first snapshot of the real or virtual machine includes generating the first plurality of data sets using one of replication of data corresponding with the first snapshot or application of erasure coding techniques to the data corresponding with the first snapshot; and
the generating the second plurality of data sets using the second snapshot of the real or virtual machine includes generating the second plurality of data sets using one of replication of data corresponding with the second snapshot or application of erasure coding techniques to the data corresponding with the second snapshot.

8. The method of claim 1, wherein:
the determining the plurality of estimated times to failure for the plurality of disks at the first point in time includes determining a plurality of mean-time-to-failure values for the plurality of disks using the disk ages for the plurality of disks at the first point in time.

9. The method of claim 1, wherein:
the first snapshot comprises a full image snapshot of the virtual machine.

10. The method of claim 1, further comprising:
determining a plurality of disk fullness values for the plurality of disks at the first point in time, the identifying the first subset of the plurality of disks includes identifying the first subset of the plurality of disks using the plurality of estimated times to failure for the plurality of disks at the first point in time and the plurality of disk fullness values for the plurality of disks at the first point in time.

11. A data management system, comprising:
a memory configured to store a first snapshot of a real or virtual machine and store a second snapshot of the real or virtual machine different from the first snapshot of the virtual machine; and
one or more processors configured to perform operations comprising, at least:
generating a first plurality of data sets using the first snapshot of the real or virtual machine;
acquiring disk ages for a plurality of disks at a first point in time;
determining a plurality of estimated times to failure for the plurality of disks at the first point in time using the disk ages for the plurality of disks at the first point in time;
identifying a first subset of the plurality of disks less than all of the disks of the plurality of disks using the plurality of estimated times to failure for the plurality of disks at the first point in time;
identifying a second subset of the plurality of disks different from the first subset of the plurality of disks using the plurality of estimated times to failure for the plurality of disks at the first point in time;
storing a first data set of the first plurality of data sets using the first subset of the plurality of disks;
storing a second data set of the first plurality of data sets using the second subset of the plurality of disks;
acquiring a second snapshot of the real or virtual machine subsequent to acquiring the first snapshot of the real or virtual machine;
generating a second plurality of data sets using the second snapshot of the real or virtual machine;
acquiring disk ages for the plurality of disks at a second point in time subsequent to the first point in time;
determining a plurality of estimated times to failure for the plurality of disks at the second point in time using the disk ages for the plurality of disks at the second point in time;
identifying a third subset of the plurality of disks less than all of the disks of the plurality of disks using the plurality of estimated times to failure for the plurality of disks at the second point in time, wherein the first subset of the plurality of disks is different from the third subset of the plurality of disks; and
storing a third data set of the second plurality of data sets using the third subset of the plurality of disks.

12. The system of claim 11, wherein:
the identifying the first subset of the plurality of disks includes identifying a first grouping of the plurality of disks with an estimated time to failure associated with a first time period; and
the identifying the second subset of the plurality of disks includes identifying a second grouping of the plurality of disks with an estimated time to failure associated with a second time period different from the first time period.

13. The system of claim 12, wherein:
the first grouping of the plurality of disks has an estimated time to failure between one year and two years and the second grouping of the plurality of disks has an estimated time to failure of less than one year.

14. The system of claim 12, wherein:
the first time period does not overlap with the second time period.

15. The system of claim 11, wherein the operations further comprise:
concurrently writing a third data chunk of the third data set to a third disk of the plurality of disks and writing a fourth data chunk of a fourth data set to a fourth disk of the plurality of disks.

16. The system of claim 15, wherein: the third disk comprises a third hard-disk drive; and the fourth disk comprises a fourth hard-disk drive.

17. The system of claim 11, wherein:
the generating the first plurality of data sets using the first snapshot of the real or virtual machine includes generating the first plurality of data sets using one of replication of data corresponding with the first snapshot or application of erasure coding techniques to the data corresponding with the first snapshot; and
the generating the second plurality of data sets using the second snapshot of the real or virtual machine includes generating the second plurality of data sets using one of replication of data corresponding with the second snapshot or application of erasure coding techniques to the data corresponding with the second snapshot.

18. The system of claim 11, wherein:
the determining the plurality of estimated times to failure for the plurality of disks at the first point in time includes determining a plurality of mean-time-to-failure values for the plurality of disks using the disk ages for the plurality of disks at the first point in time.

19. The system of claim 11, wherein:
the first snapshot comprises a full image snapshot of the virtual machine.

20. The system of claim 11, wherein the operations further comprise:
determining a plurality of disk fullness values for the plurality of disks at thefirst point in time, the identifying the first subset of the plurality of disks includes identifying the first subset of the plurality of disks using the plurality of estimated times to failure for the plurality of disks at the first point in time and the plurality of disk fullness values for the plurality of disks at the first point in time.

21. A non-transitory machine-readable medium comprising instructions which, when read by a machine, cause the machine to perform operations at a data management system comprising a memory configured to store a first snapshot of a real or virtual machine and store a second snapshot of the real or virtual machine different from the first snapshot of the virtual machine, the operations comprising, at least:
generating a first plurality of data sets using the first snapshot of the real or virtual machine;
acquiring disk ages for a plurality of disks at a first point in time;
determining a plurality of estimated times to failure for the plurality of disks at the first point in time using the disk ages for the plurality of disks at the first point in time;
identifying a first subset of the plurality of disks less than all of the disks of the plurality of disks using the plurality of estimated times to failure for the plurality of disks at the first point in time;
identifying a second subset of the plurality of disks different from the first subset of the plurality of disks using the plurality of estimated times to failure for the plurality of disks at the first point in time;
storing a first data set of the first plurality of data sets using the first subset of the plurality of disks;

storing a second data set of the first plurality of data sets using the second subset of the plurality of disks;

acquiring a second snapshot of the real or virtual machine subsequent to acquiring the first snapshot of the real or virtual machine;

generating a second plurality of data sets using the second snapshot of the real or virtual machine;

acquiring disk ages for the plurality of disks at a second point in time subsequent to the first point in time;

determining a plurality of estimated times to failure for the plurality of disks at the second point in time using the disk ages for the plurality of disks at the second point in time;

identifying a third subset of the plurality of disks less than all of the disks of the plurality of disks using the plurality of estimated times to failure for the plurality of disks at the second point in time, wherein the first subset of the plurality of disks is different from the third subset of the plurality of disks; and storing a third data set of the second plurality of data sets using the third subset of the plurality of disks.

* * * * *

UNITED STATES PATENT AND TRADEMARK OFFICE
CERTIFICATE OF CORRECTION

PATENT NO. : 11,030,062 B2
APPLICATION NO. : 16/569008
DATED : June 8, 2021
INVENTOR(S) : Juniwal et al.

It is certified that error appears in the above-identified patent and that said Letters Patent is hereby corrected as shown below:

In the Specification

In Column 2, Line 26, delete "duster" and insert --cluster-- therefor

In Column 2, Line 29, delete "duster" and insert --cluster-- therefor

In Column 23, Lines 40-41, delete "/snapshops/VM_A/s3/s3.delta)," and insert --/snapshots/VM_A/s3/s3.delta),-- therefor In Column 27, Line 42, delete "files." and insert --files).-- therefor In the Claims In Column 44, Line 36, in Claim 6, after "wherein:", insert a linebreak In Column 44, Line 37, in Claim 6, after "and", insert a linebreak In Column 46, Line 7, in Claim 16, after "wherein:", insert a linebreak In Column 46, Line 8, in Claim 16, after "and", insert a linebreak In Column 46, Line 36, in Claim 20, delete "thefirst" and insert --the first-- therefor Signed and Sealed this
Third Day of September, 2024

Katherine Kelly Vidal
*Director of the United States Patent and Trademark Office*